US007396202B1

(12) United States Patent
Panzarella et al.

(10) Patent No.: US 7,396,202 B1

(45) Date of Patent: Jul. 8, 2008

(54) LIFT AND CARRIER ASSEMBLY FOR A PERSONAL-TRANSPORTATION VEHICLE

(75) Inventors: Thomas A. Panzarella, Harleysville, PA (US); James B. Eldon, III, Barto, PA (US); David D. McClanahan, Harleysville, PA (US)

(73) Assignee: Cook Technologies, Inc., Green Lane, PA (US)

( * ) Notice: Subject to any disclaimer, the term of this patent is extended or adjusted under 35 U.S.C. 154(b) by 292 days.

(21) Appl. No.: 10/860,859

(22) Filed: Jun. 3, 2004

Related U.S. Application Data

(60) Provisional application No. 60/475,308, filed on Jun. 3, 2003.

(51) Int. Cl.
*B60P 3/00* (2006.01)

(52) U.S. Cl. ....................... 414/542; 414/540; 414/541; 414/546; 414/641; 414/647; 414/674; 414/917; 414/921

(58) Field of Classification Search ................. 414/540, 414/641, 542, 647, 921, 541, 546, 674, 917
See application file for complete search history.

(56) References Cited

U.S. PATENT DOCUMENTS

| | | | | |
|---|---|---|---|---|
| 3,468,401 | A * | 9/1969 | Letz | 187/268 |
| 3,485,392 | A * | 12/1969 | Lofgren | 414/547 |
| 3,651,965 | A * | 3/1972 | Simonelli et al. | 414/540 |
| 3,957,164 | A * | 5/1976 | Brown | 414/542 |
| 4,133,437 | A * | 1/1979 | Gates | 414/541 |
| 5,011,361 | A | 4/1991 | Peterson | 414/462 |
| 5,052,879 | A * | 10/1991 | Wolfe | 414/541 |
| 5,308,214 | A * | 5/1994 | Crain et al. | 414/541 |
| 5,319,990 | A * | 6/1994 | Veale et al. | 74/89.33 |
| 5,567,107 | A | 10/1996 | Bruno et al. | 414/462 |
| 6,497,546 | B2 | 12/2002 | Wood et al. | 414/523 |
| 6,692,215 | B1 | 2/2004 | Panzarella et al. | 414/462 |
| 6,726,435 | B1 * | 4/2004 | Williams et al. | 414/542 |
| 2001/0026756 | A1 * | 10/2001 | Mortimore | 414/556 |
| 2004/0074351 | A1 * | 4/2004 | Nitagai et al. | 82/124 |

FOREIGN PATENT DOCUMENTS

JP 06329361 * 11/1994

* cited by examiner

*Primary Examiner*—Saul J. Rodriguez
*Assistant Examiner*—Michael S Lowe
(74) *Attorney, Agent, or Firm*—Synnestvedt & Lechner LLP

(57) ABSTRACT

A preferred embodiment of a lift and carrier assembly for a personal-transportation vehicle includes a deck frame, a platform, and a trolley assembly mounted on the deck frame. The trolley assembly includes a drive nut, a motor for rotating the drive nut, and a drive screw threadably coupled to the drive nut so that rotation of the drive nut causes the platform and the drive motor to translate linearly in relation to the deck frame. The lift and carrier assembly also includes an arm assembly mounted on the trolley system and comprising a first and a second arm member, and an actuator pivotally coupled to the first and second arm members for moving the first and second arm members so that first and second arm members move the platform between an upper and a lower position in relation to the deck frame.

26 Claims, 20 Drawing Sheets

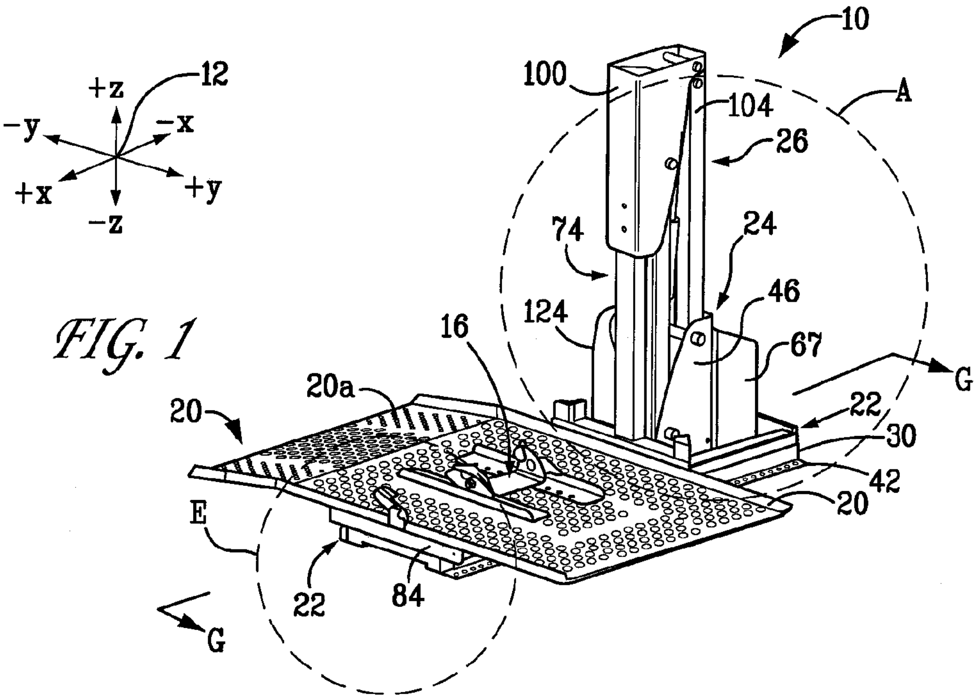
FIG. 1
FIG. 2
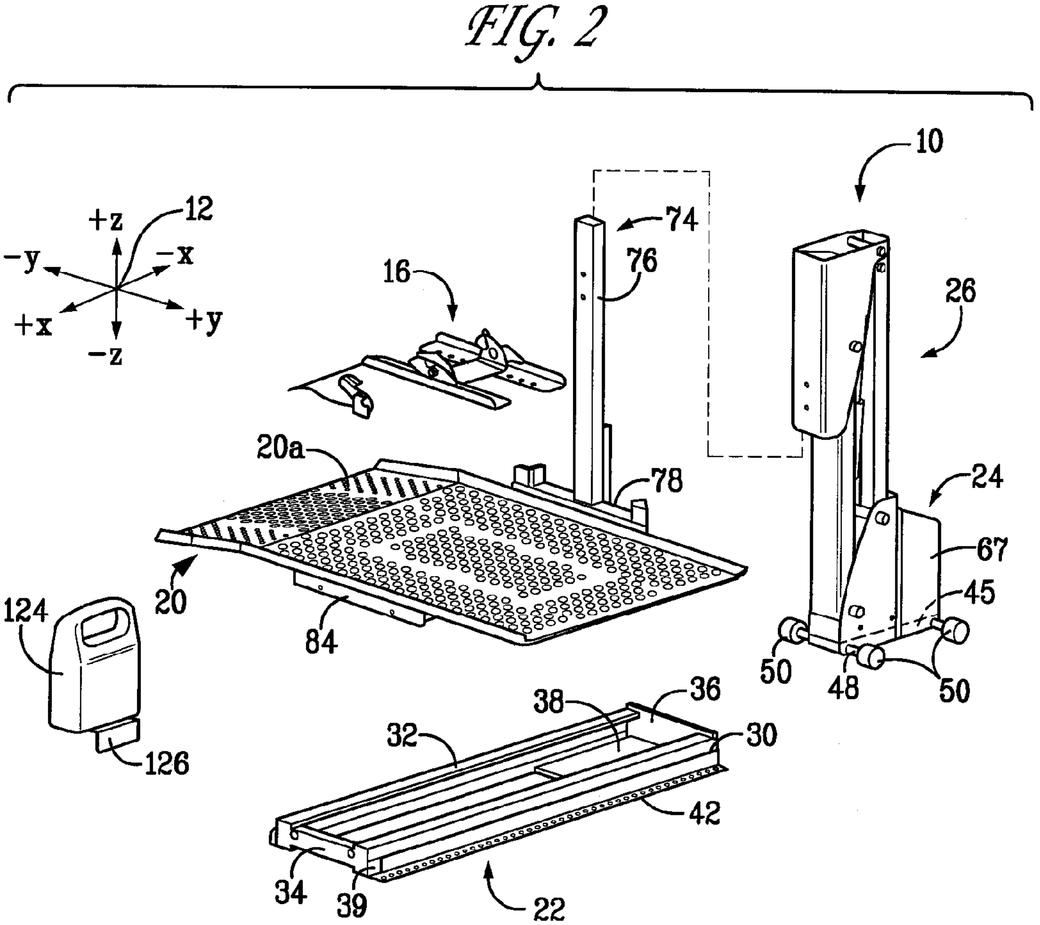

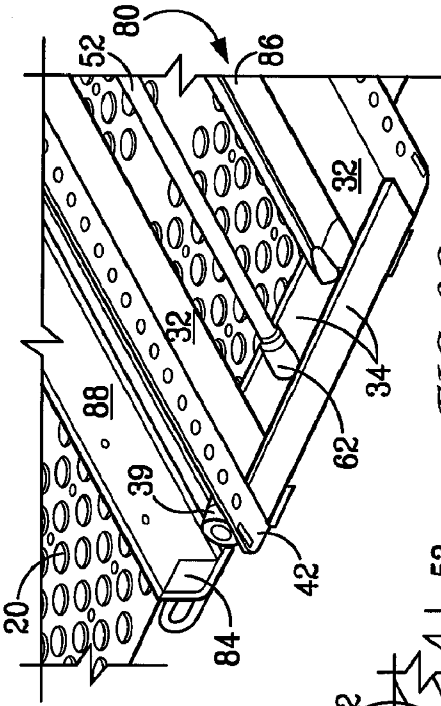
FIG. 9C
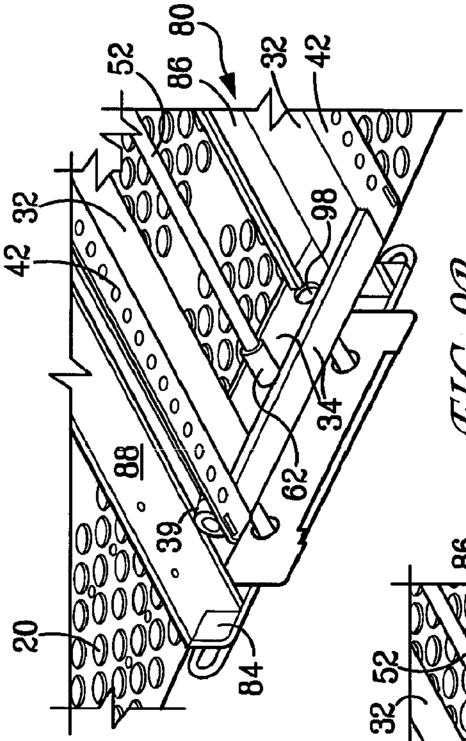
FIG. 9B
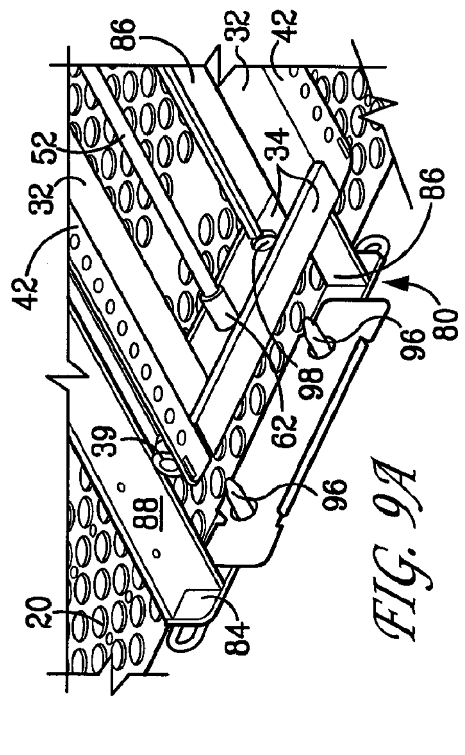
FIG. 9A
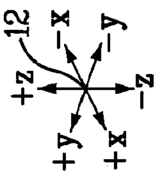

LIFT AND CARRIER ASSEMBLY FOR A PERSONAL-TRANSPORTATION VEHICLE

CROSS-REFERENCE TO RELATED APPLICATION

This application is based on provisional application No. 60/475,308 filed Jun. 3, 2003, the entirety of which is incorporated herein by reference.

FIELD OF THE INVENTION

The present invention relates generally to an assembly for lifting and carrying a personal-transportation vehicle such as a power chair. The assembly can be used, for example, to lift the personal-transportation vehicle into and out of a larger motorized vehicle such as a van, pickup truck, or passenger car, and to support the personal-transportation within the vehicle.

BACKGROUND OF THE INVENTION

Personal-transportation vehicles such as power chairs, motorized wheelchairs, and scooters are commonly used by persons with ambulatory difficulties or other disabilities. Personal-transportation vehicles are often transported using a larger motorized vehicle such as a van, pickup truck, passenger car, etc. (hereinafter referred to as a "transporting vehicle").

Lift and carrier assemblies have been developed for lifting personal transportation-vehicles onto and off of transporting vehicles, and for supporting the personal transportation-vehicle on the transporting vehicle. A lift and carrier assembly can be configured to suspend the personal-transportation vehicle external to the transporting vehicle. Alternatively, a lift and carrier assembly can be configured to retract into the transporting vehicle, thereby permitting the personal-transportation vehicle to be transported while located within the transporting vehicle.

The amount of space available to accommodate a personal-transportation vehicle and a lift and carrier assembly with a transporting vehicle is often limited. Hence, lift and carrier assemblies that retract into the transporting vehicle should be relatively compact. Moreover, the floorboard or other mounting surface within the transporting vehicle may be recessed or irregularly-shaped. Hence, the lift and carrier assembly should include provisions to accommodate such surfaces.

Automated operation of a lift and carrier assembly is desirable, as such assemblies are commonly operated by persons with ambulatory difficulties. A lift and carrier assembly should also have provisions for manual operation in the event automated operation is not possible, e.g., when electrical power is not available.

A lift and carrier assembly should be constructed to minimize the possibility of operator injury. For example, a lift and carrier assembly may be operated while the transporting vehicle is parked on a steep or other irregular surface. This scenario can introduce the potential for uncontrolled ("run-away") movement of various components of the lift and carrier assembly (and the personal-transportation vehicle) due to the effects of gravity.

SUMMARY OF THE INVENTION

A preferred embodiment of a lift and carrier assembly for a personal-transportation vehicle comprises a deck frame for mounting on a surface, and a trolley assembly mounted on the deck frame and comprising a drive nut, a motor for rotating the drive nut, and a drive screw fixedly coupled to the deck frame and threadably coupled to the drive nut so that rotation of the drive nut causes a least a portion of the trolley assembly to translate linearly in relation to the deck frame.

The lift and carrier assembly also comprises a platform for supporting the personal-transportation vehicle. The platform is coupled to the trolley assembly so that the platform translates linearly in relation to the deck frame in response to the linear translation of the at least a portion of the trolley assembly.

The lift and carrier assembly also comprises an arm assembly comprising a first and a second arm member each mechanically coupled to the platform and the trolley system, and an actuator pivotally coupled to the first and second arm members for moving the first and second arm members so that first and second arm members lift and lower the platform in relation to the deck frame.

Another preferred embodiment of a lift and carrier assembly for a personal-transportation vehicle comprises a deck frame, a platform, and a trolley assembly mounted on the deck frame. The trolley assembly comprises a drive nut, a motor for rotating the drive nut, and a drive screw threadably coupled to the drive nut so that rotation of the drive nut causes the platform and the motor to translate linearly in relation to the deck frame.

The lift and carrier assembly also comprises an arm assembly mounted on the trolley system and comprising a first and a second arm member, and an actuator pivotally coupled to the first and second arm members for moving the first and second arm members so that first and second arm members move the platform between an upper and a lower position in relation to the deck frame.

Another preferred embodiment of a lift and carrier assembly for a personal-transportation vehicle comprises a deck frame comprising a first and a second rail spaced apart by a first distance, a platform, and a trolley assembly mounted on the deck frame. The trolley assembly comprises a drive nut and a drive screw threadably coupled to the drive nut so that rotation of the drive nut causes the platform to translate between an extended position and a retracted position in relation to the deck frame.

The lift and carrier assembly also comprises an arm assembly mounted on the trolley system. The arm assembly comprises a first and a second arm member, and an actuator pivotally coupled to the first and second arm members for moving the first and second arm members so that first and second arm members lift and lower the platform in relation to the deck frame.

The lift and carrier assembly also comprises a platform frame comprising a first and a second arm member having the platform mounted thereon and being spaced apart by a second distance greater than the first distance.

BRIEF DESCRIPTION OF THE DRAWINGS

The foregoing summary, as well as the following detailed description of a presently-preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings:

FIG. 1 is a perspective view of a preferred embodiment of a lift and carrier assembly, with a platform of the lift and carrier assembly in an upper retracted position;

FIG. 2 is a partially exploded view of the lift and carrier assembly shown in FIG. 1;

FIGS. 9A-9C are magnified bottom perspective views of the area designated "E" in FIG. 1, showing the platform of the lift and carrier assembly approaching and reaching its upper, retracted position;

DESCRIPTION OF PREFERRED EMBODIMENTS

A preferred embodiment of a lift and carrier assembly 10 is depicted in FIGS. 1-19. The figures are referenced to a common coordinate system 12 included therein. The lift and carrier assembly 10 can be used to lift a personal transport vehicle, such as a power chair 14 (see FIG. 20), onto a motorized vehicle such as a van, pickup truck, automobile, etc. (hereinafter referred to as a "transporting vehicle").

It should be noted that the lift and carrier assembly 10 is described in connection with the power chair 14 for exemplary purposes only. The lift and carrier assembly 10 can be used in conjunction with other types of personal-transportation vehicles, such as wheelchairs, motorized scooters, etc.

Figure 18B:
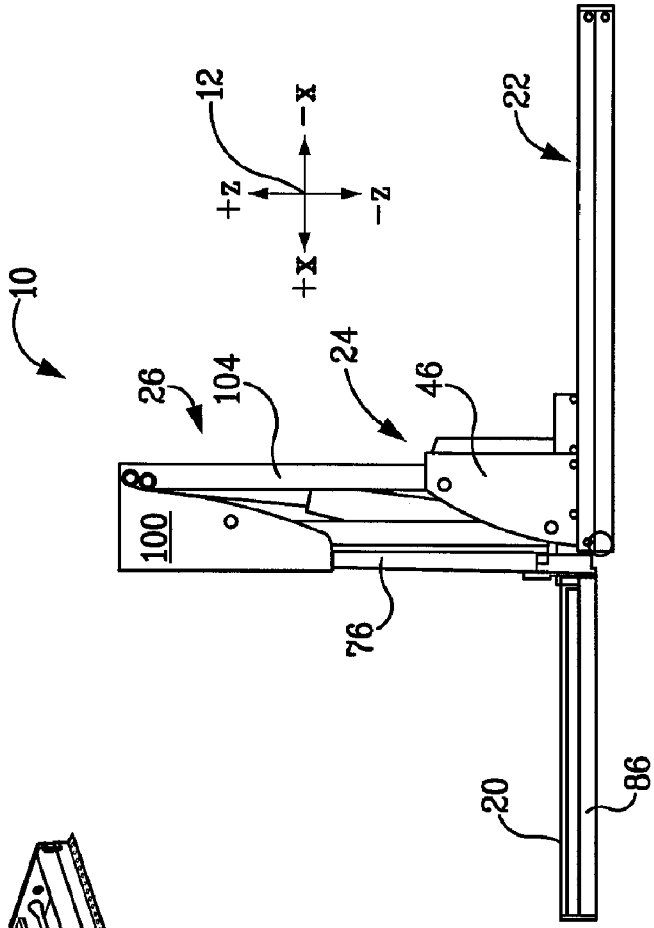
FIG. 18B is a side view of the lift and carrier assembly as shown in FIG. 18A.
Figure 18A:
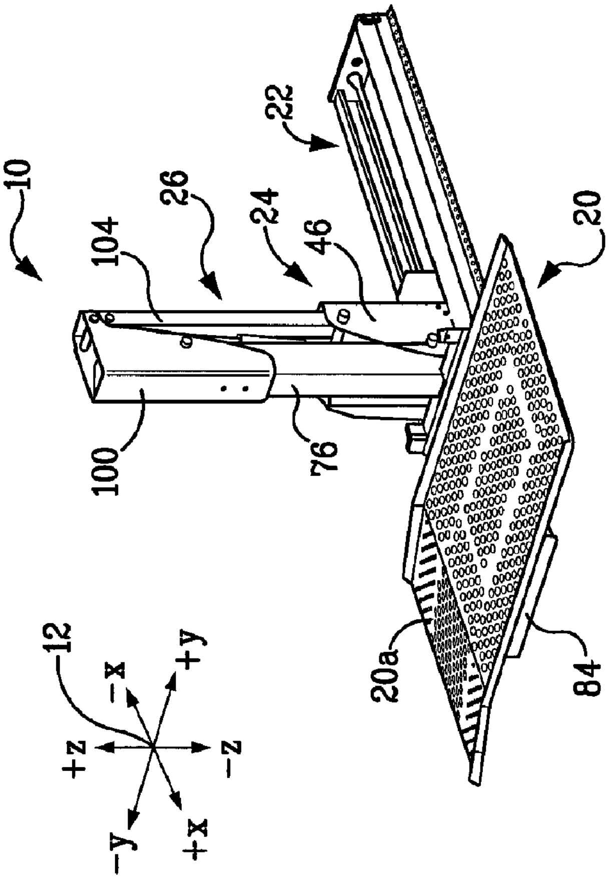
FIG. 18A is a perspective view of the lift and carrier assembly shown in FIGS. 1-17B, with the platform of the lift and carrier assembly in an upper extended position.

The lift and carrier assembly 10 comprises a platform 20 for holding the personal-transportation vehicle 14 (see, e.g., FIG. 1). The platform 20 can translate vertically (in the "z" direction) between a lower, extended position proximate the ground (see FIGS. 15A and 15B), and an upper, extended position (FIGS. 18A and 18B). In addition, the platform 20 can translate horizontally (in the "x" direction), between the upper, extended position and an upper, retracted position inside the transporting vehicle (see FIGS. 1 and 3). (The transporting vehicle is not shown in the figures, for clarity.)

The power chair 14 can be driven, pushed, or otherwise loaded onto the platform 20 when the platform 20 is in its lower, extended position. The platform 20 preferably includes a ramp portion 20*a* that contacts the ground when the platform 20 is in its lower, extended position so that the power chair can easily be driven or otherwise loaded onto the platform 20 (see, e.g., FIG. 1).

The power chair 14 can be secured to the platform 20 by a suitable means such as a latching device 16 for a personal-transportation vehicle (see FIGS. 2 and 3), as described in U.S. provisional application No. 60/473,674, titled "Device for Securing a Personal-Transport Vehicle to a Mounting Surface," filed May 27, 2003, which is incorporated by reference herein in its entirety. Alternatively, the power chair 14 can be secured to the platform 20 by other suitable means including, for example, straps or other types of tie downs.

The lift and carrier assembly 10 comprises deck frame 22 (see, e.g., FIG. 2). The deck frame 22 is mounted on a floorboard 40 or other suitable surface of the transporting vehicle (see FIGS. 4 and 13). The lift and carrier assembly 10 also comprises a trolley system 24 mounted on the deck frame 22 (see, e.g., FIGS. 4-9). A portion of the trolley system 24 can move in the forward ("+x") and rearward ("−x") directions in relation to the deck frame 22, as explained in detail below.

The lift and carrier assembly 10 also comprises an arm assembly 26 (see, e.g., FIG. 2). The arm assembly 26 is mechanically coupled to the platform 20, and can lift the platform 20 between its upper, extended and lower, extended positions. The arm assembly 26 is mounted on the trolley system 24 so that the arm assembly 26 translates with the trolley system 24 in relation to the deck frame 22. This feature permits the platform 20 (and the power chair 14) to be retracted into the transporting vehicle once the platform 20 has been lifted to its upper, extended position.

Figure 7:
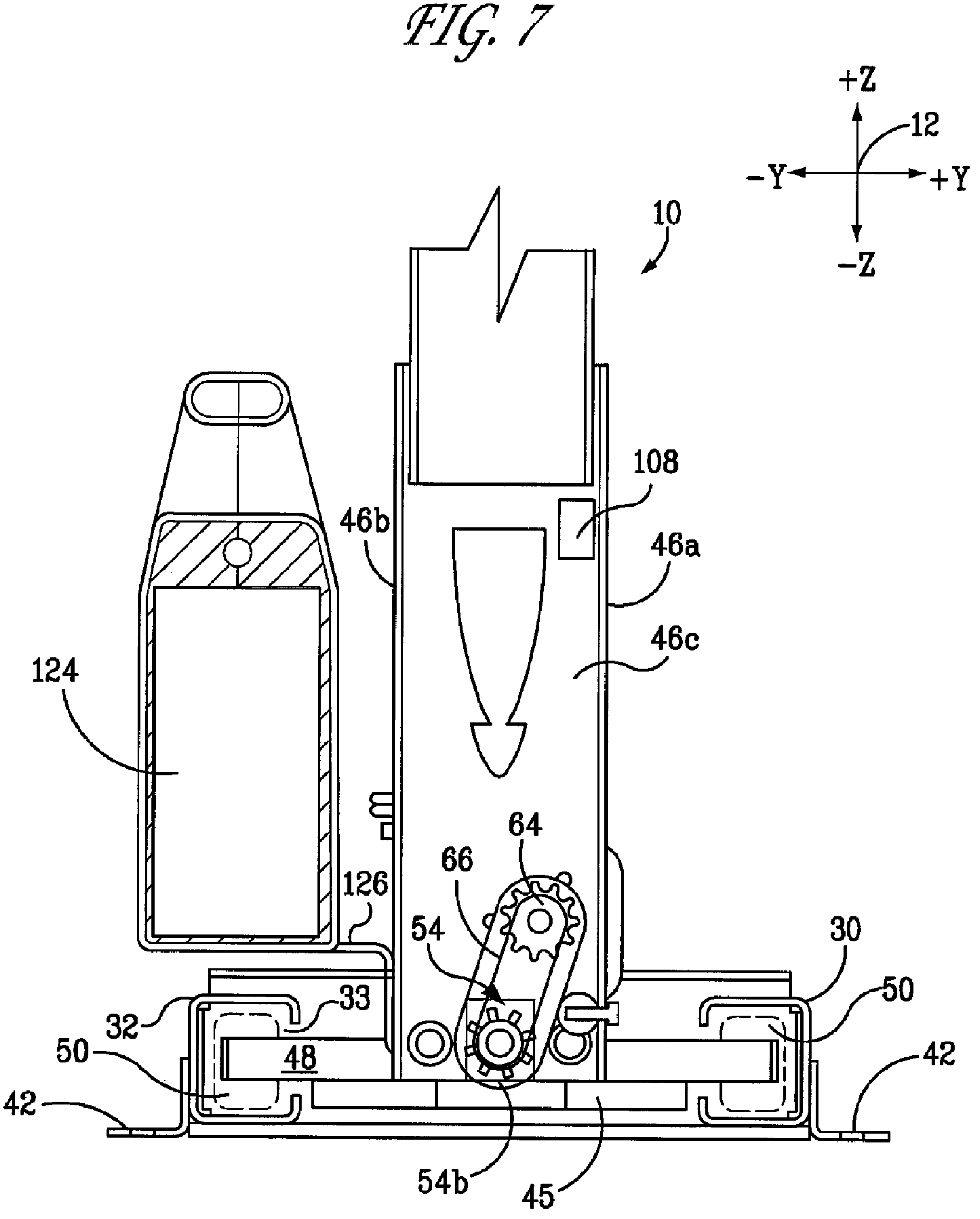
FIG. 7 is a front cross-sectional view of the lift and carrier assembly shown in FIGS. 1-6, taken through the line "C-C" of FIG. 5.
Figure 8:
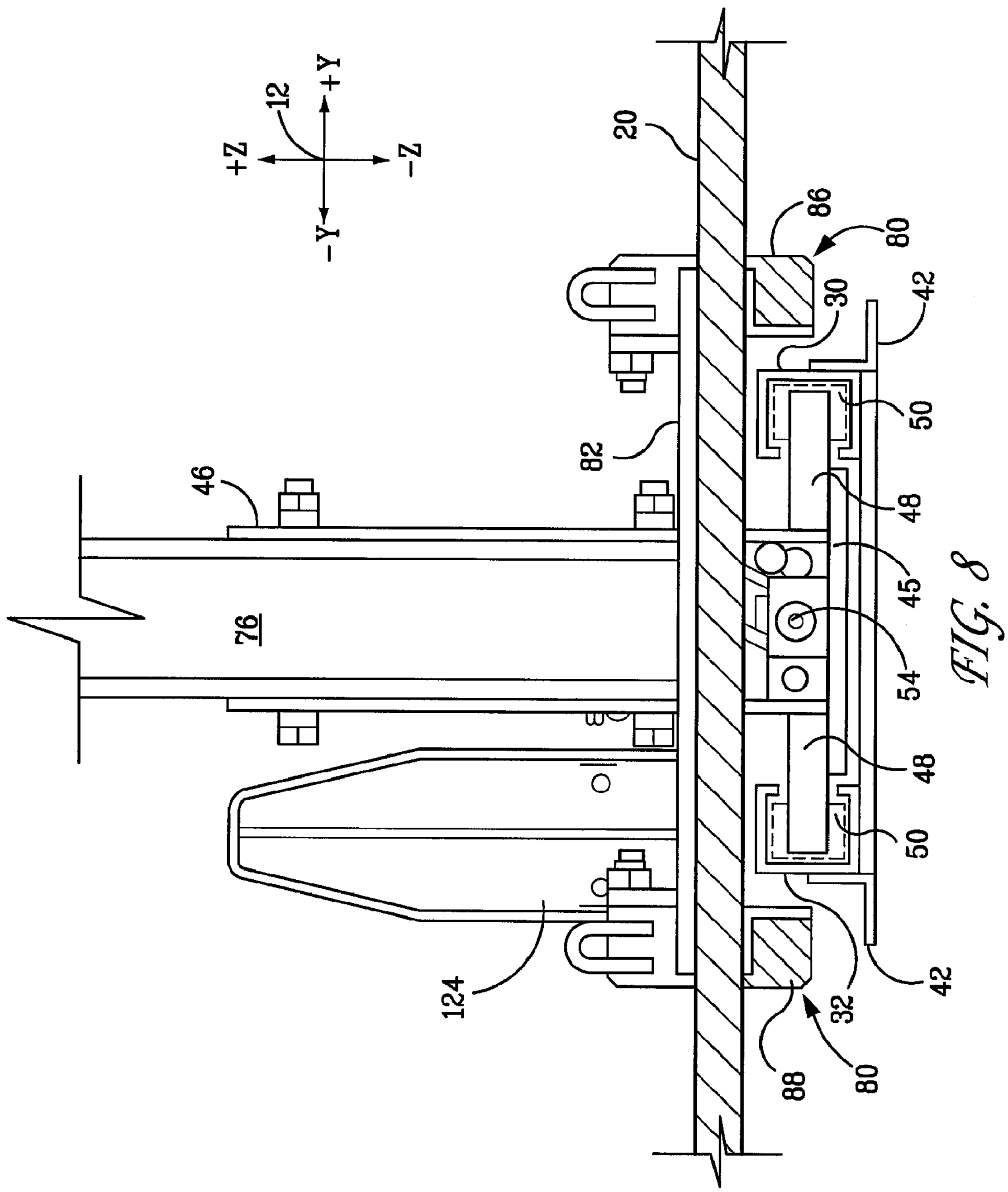
FIG. 8 is a front cross-sectional view of the lift and carrier assembly shown in FIGS. 1-7, taken through the line "D-D" of FIG. 5.
Figure 10:
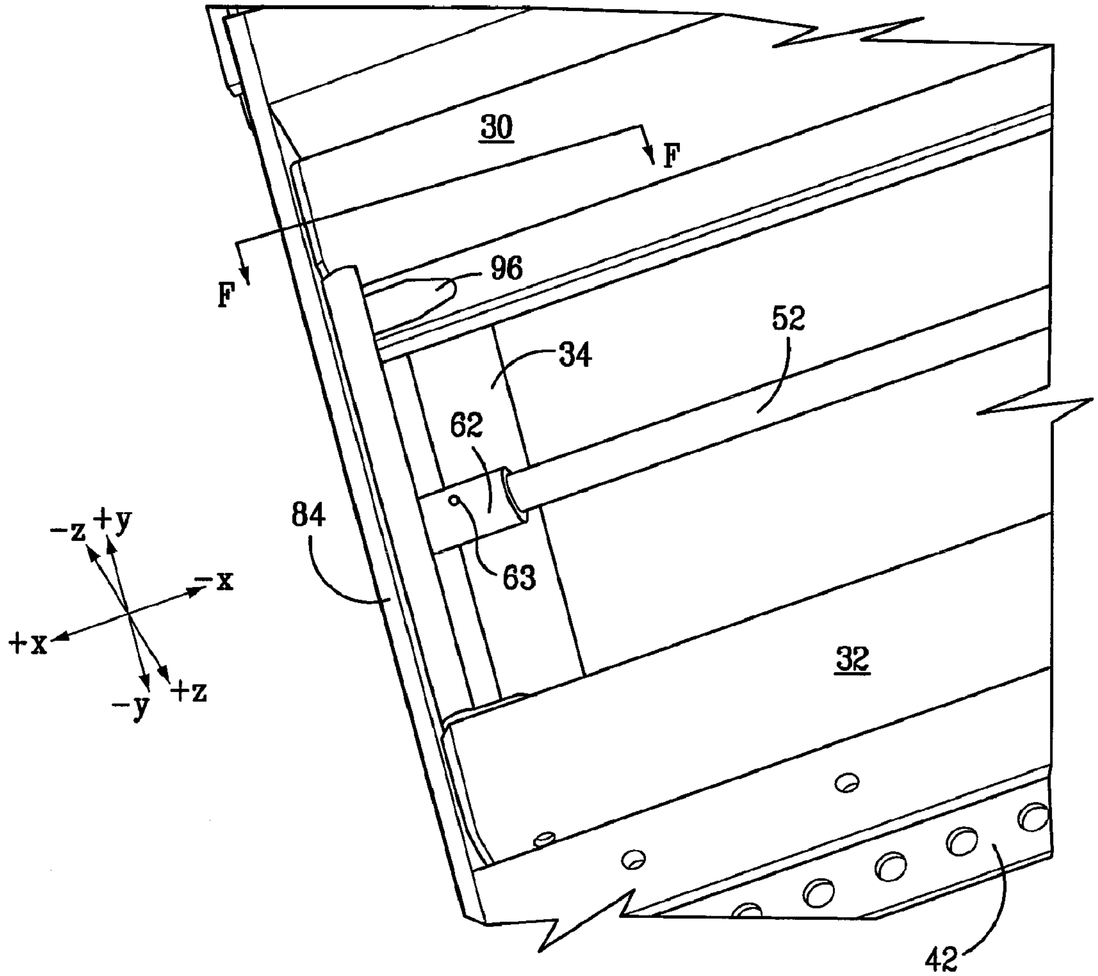
FIG. 10 is a magnified bottom perspective view of the area designated "E" in FIG. 1, when the platform of the lift and carrier assembly is in its upper retracted position.
Figure 11:
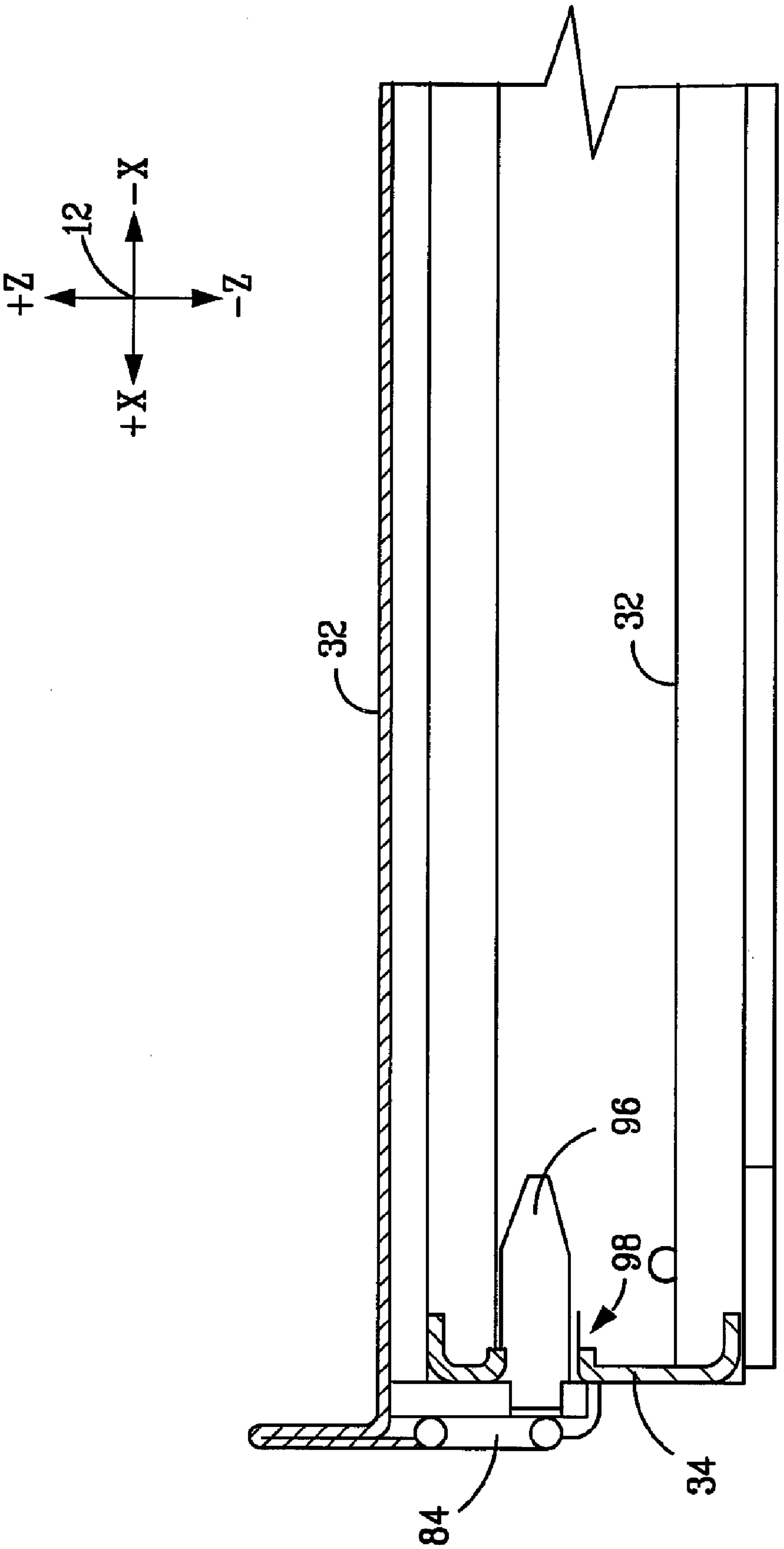
FIG. 11 is a side cross sectional view taken through the line "F-F" of FIG. 10.

The deck frame 22 comprises a first and a second rail 30, 32 (see FIGS. 2, 4, 7, and 8). The first and second rails 30, 32 each have a slot 33 formed in an inwardly-facing surface thereof, as shown in FIGS. 7 and 8. This feature gives each of the first and second rails 30, 32 a substantially C-shaped cross section.

The deck frame 22 also comprises a first and a second cross member 34, 36 (see FIGS. 2, 4, and 9A-10). The first cross member 34 is fixedly coupled to a first end of each of the first and second rails 30, 32. The second cross member 36 is fixedly coupled to a second end of each of the first and second rails 30, 32.

The deck frame 22 also comprises a base member 38 (see FIG. 2). The base member 38 is fixedly coupled to the first and second rails 30, 32 proximate the second cross member 36. Preferably, a first and a second wheel 39 are rotatably coupled to the respective first and second rails 30, 32, proximate the first cross member 34, i.e., the first and a second wheels 39 are coupled to the respective first and second rails 30, 32 so that the first and a second wheels 39 can rotate in relation to the respective first and second rails 30.

Figure 4:
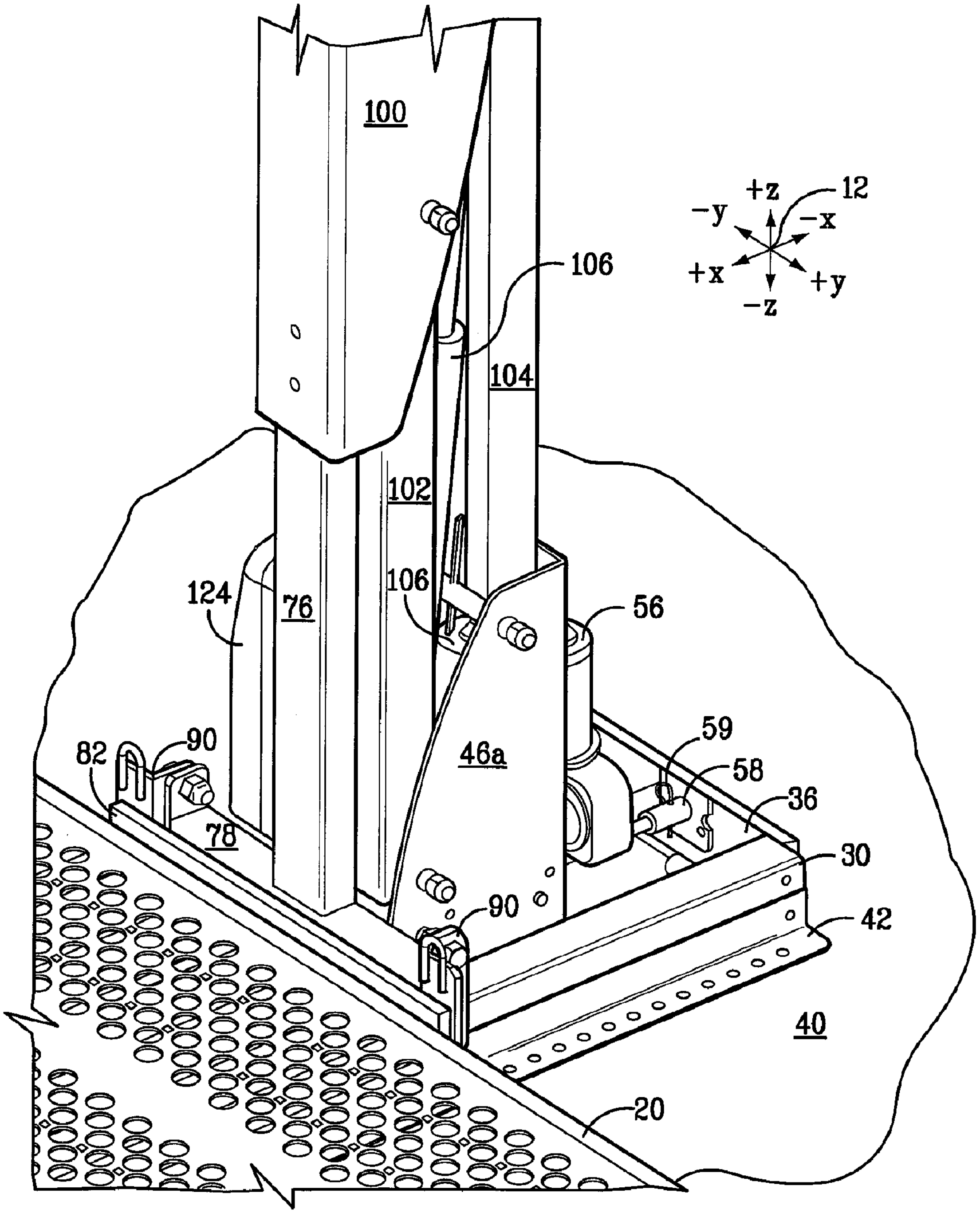
FIG. 4 is a magnified view of the area designated "A" in FIG. 1.
Figure 5:
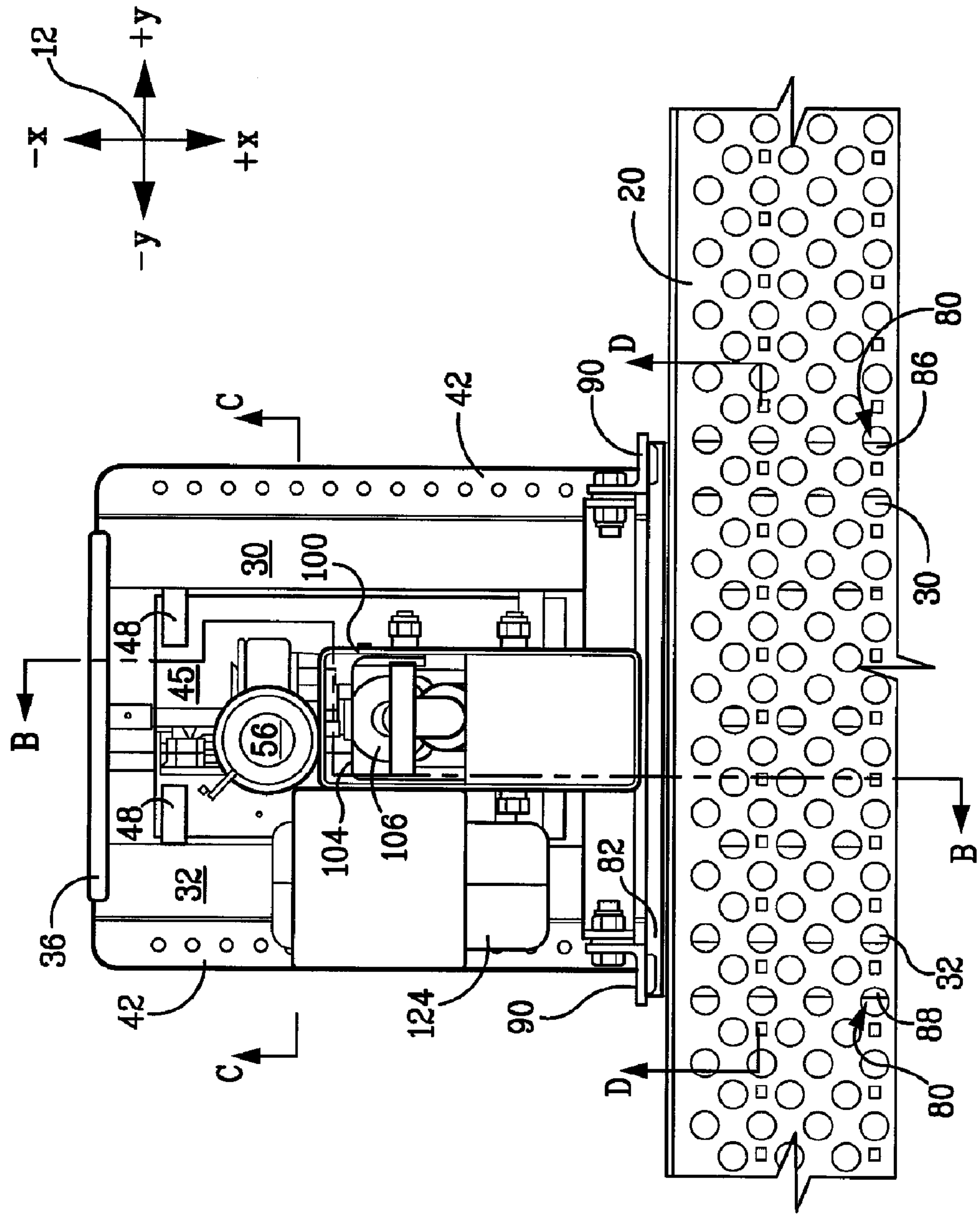
FIG. 5 is an upper view of the portion of the lift and carrier assembly shown in FIG. 4.

The deck frame 22 can be mounted directly on the floorboard 40 or other suitable surface of a transporting vehicle using, for example, a first and second angled bracket 42 (see, e.g., FIGS. 4 and 5). The first and second angled brackets 42 can be secured to the respective first and second rails 30, 32, and to the floorboard 40 using, for example, fasteners (not shown).

Figure 14A:
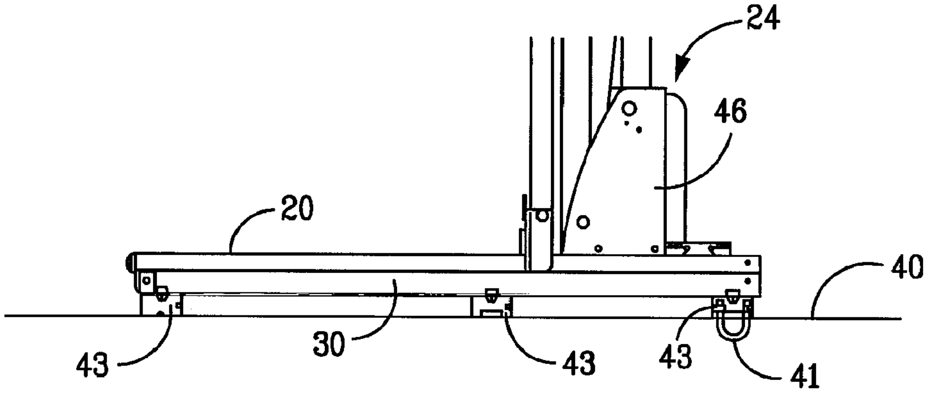
FIG. 14A is a side view of the portion of the lift and carrier assembly shown in FIG. 13, showing an alternative mounting arrangement for the lift and carrier assembly.
Figure 14B:
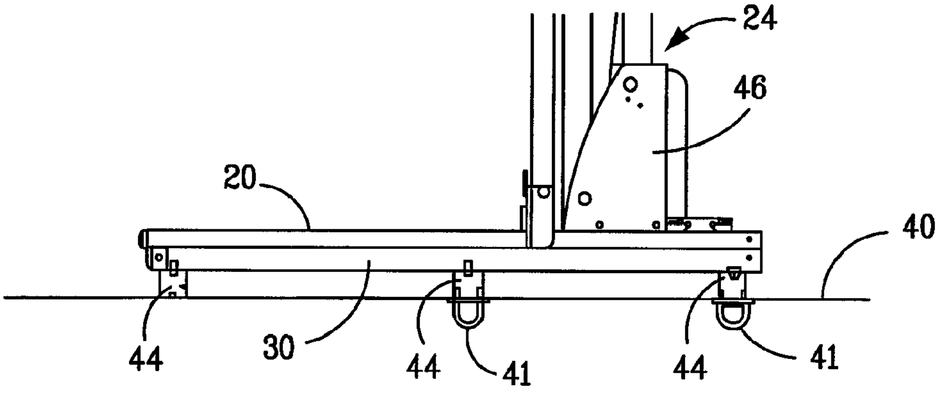
FIG. 14B is a side view of a portion of the lift and carrier assembly shown in FIGS. 13 and 14A, showing another alternative mounting arrangement for the lift and carrier assembly.

Alternatively, the deck frame 22 can be mounted on tube members 43, 44 (see FIGS. 14A and 14B). The tube members 43, 44 can be used in installations where additional height is required for the platform 20 to clear the transporting vehicle when moving from its upper, retracted position to its upper, extended position. For example, the floorboard 40 may be recessed in relation to the opening in the transporting vehicle through which the platform 20 through which the platform 20 travels when moving between its upper, retracted and upper, extended positions. This type of installation may require that the height of the deck member 22 (and the platform 20) be greater than would otherwise be required.

The tube members 43, 44 each preferably have a substantially rectangular cross section. The height of the tube members 43, 44 can be chosen so as to provide the deck frame 22 (and the platform 20) with the additional height required for a particular installation. The tube members 43, 44 can be secured to the floorboard 40 of the transporting vehicle, for example, using U-shaped hooks 41 that engage the recessed pins (not shown) commonly provided in the floorboards of many types of transporting vehicles.

The trolley system 24 comprises a bottom member 45, and a bracket member 46 mounted on the bottom member 45 (see FIGS. 4-8 and 22). The bracket member 46 includes a first and second side panel 46*a*, 44*b*, and a rear panel 46*c* that adjoins the first and second side panels 46*a*, 46*b*.

A first and a second axle 48 are fixedly coupled to a first side of the bottom member 45, proximate the respective forward and rearward ends thereof (see FIGS. 5, 7, 8, and 22). The first and second axles each extend through the slot 33 formed in the first rail 30 of the deck frame 22. A third and a fourth of the axles 48 are fixedly coupled to a second side of the bottom member 45, proximate the respective forward and rearward ends thereof. The third and fourth axles each extend through the slot 33 formed in the second rail 32.

A wheel 50 is rotatably coupled to each of the axles 48. The wheels 50 associated with the first and second of the axles 48 are positioned within the first rail 30, as shown in FIGS. 7 and 8. The wheels 50 associated with the third and fourth of the axles 48 are positioned within the second rail 32. The wheels 50 can translate in the forward and rearward directions within the rails 30, 32. This feature permits the bracket member 46 to translate in the forward and rearward directions in relation to the deck frame 22.

The trolley system 24 also comprises a drive screw 52, a drive nut and sprocket assembly 54, and an electric motor 56 (see FIGS. 4-8, 13, and 21; the motor 56 is shown only in FIGS. 4-6 and 13, for clarity). The drive nut and sprocket assembly 54 is threadably coupled to the drive screw 52 by way of threads disposed on an inner circumferential surface 54*a* of the drive nut and sprocket assembly 54, and threads disposed on an outer circumferential surface of the drive screw 52 (see FIGS. 6 and 21; the threads on the drive screw 52 are shown only in FIG. 6, for clarity). Preferably, the drive screw 52 is a multi-start screw having eight starts per inch (the optimal value for this parameter is application dependent, and can therefore vary between applications).

The drive screw 52 is fixed in relation to the deck frame 22. In particular, a first sleeve 58 is fixedly coupled to the second cross member 36, as shown in FIG. 4. The drive screw 52 has a through hole formed in a first end thereof, and the first sleeve 58 has two diametrically opposing through holes formed therein. The first end of the drive screw 52 can be inserted in the first sleeve 58, the through holes in the drive screw 52 and the first sleeve 58 can be aligned, and a cotter pin 59 or other suitable fastening device can be inserted in the through holes to secure the drive screw 52 to the first sleeve 58.

Preferably, the first end of the drive screw 52 does not extend completely into the first sleeve 58 when the through holes in the drive screw 52 and the first sleeve 58 are aligned. The significance of this feature is discussed below.

Figure 12A:
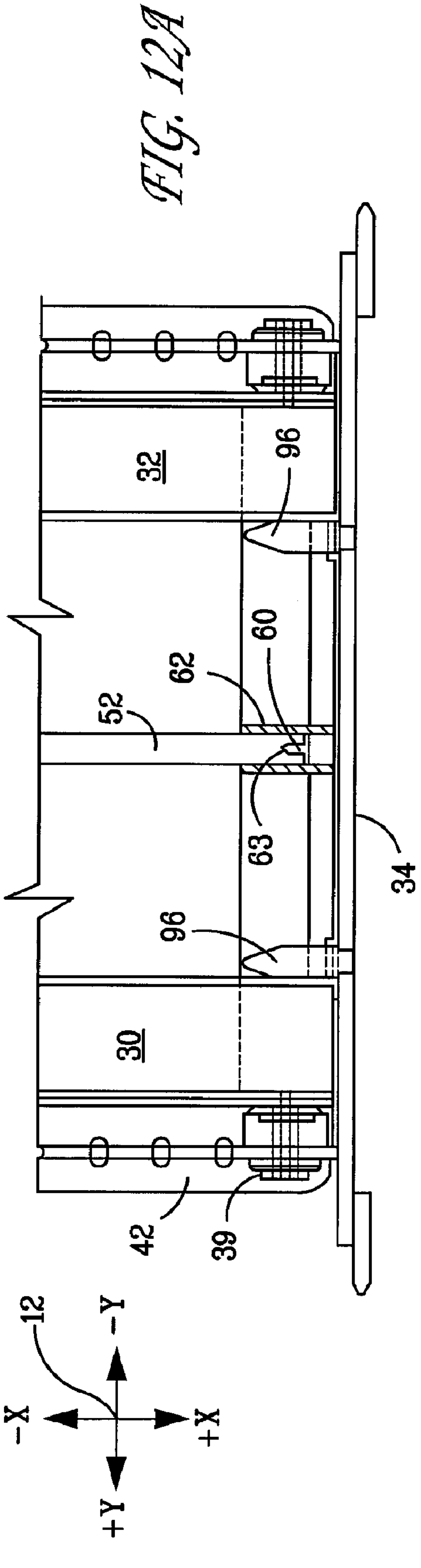
FIG. 12A is a magnified bottom view of the area designated "E" in FIG. 1, with a drive screw disengaged from a sleeve of the lift and carrier assembly.
Figure 12B:
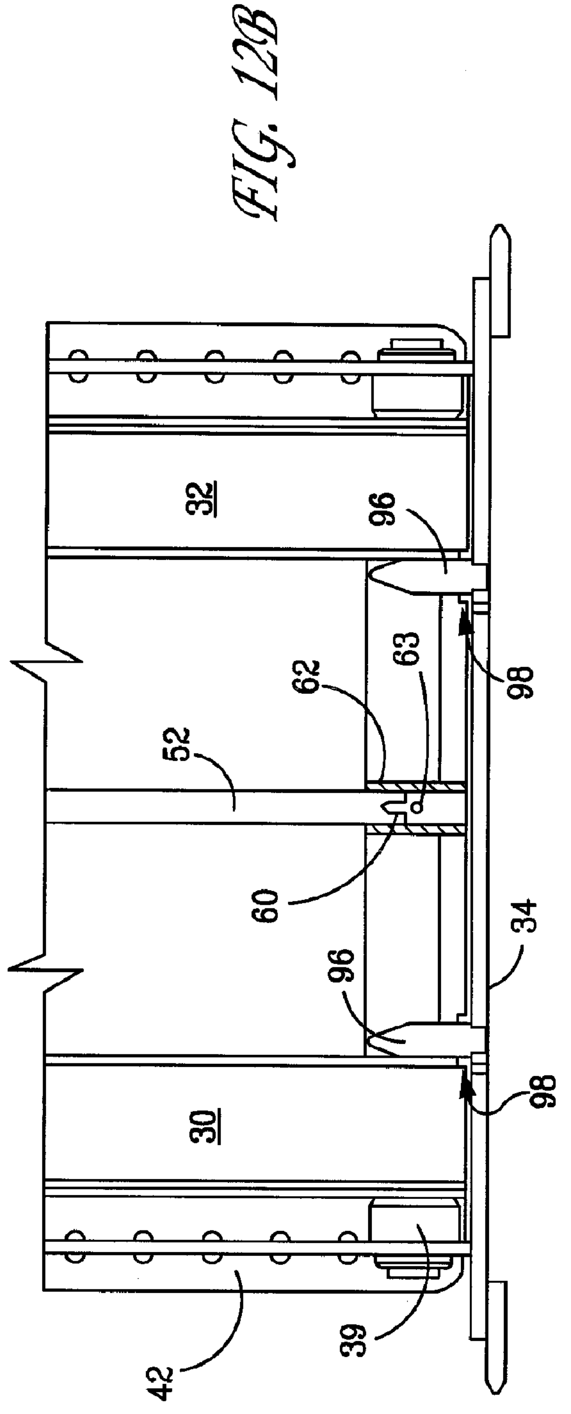
FIG. 12B is a magnified bottom view of the area designated "E" in FIG. 1, with the drive screw engaging the sleeve of the lift and carrier assembly.
Figure 13:
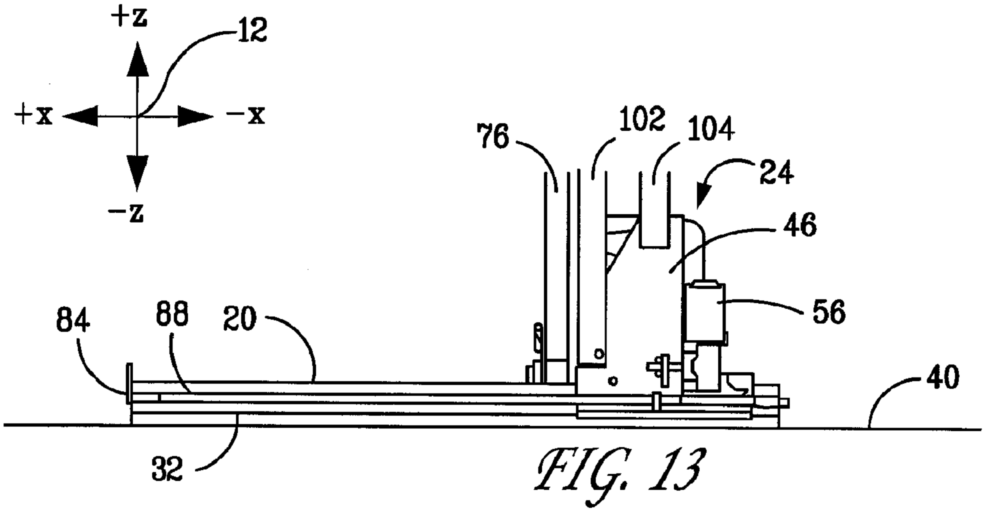
FIG. 13 is a cross-sectional side view of a portion of the lift and carrier assembly shown in FIGS. 1-12 taken along the line "G-G" of FIG. 1, with the lift and carrier assembly mounted directly on a floorboard of a transporting vehicle.

A second end of the drive screw 52 has a notch 60 formed therein (see FIGS. 12A and 12B). A second sleeve 62 is fixedly coupled the first cross member 34 of the deck frame 22, as shown in FIGS. 9A-10, 12A, and 12B. A pin 63 is secured within the second sleeve 62 (see FIGS. 12A and 12B). The pin 63 can engage the drive screw 52 by way of the notch 60 when the second end of the drive screw 52 is inserted into the second sleeve 62, thereby restraining the drive screw 52 from rotation in relation to the second sleeve 62 (and the deck member 22).

The motor 56 turns the drive nut and sprocket assembly 54 over the drive screw 52 which, in turn, causes the bracket member 46 and the other movable components of the trolley system 24 to translate in relation to the deck frame 22. More particularly, the motor 56 is fixedly coupled to the rear panel 46*c* of the bracket member 46 (see FIGS. 4-6). The motor 56 can be housed within a cover 67 (the cover 67 is shown only in FIGS. 1 and 2, for clarity).

The motor 56 drives a motor sprocket 64 mounted on an output shaft of the motor 56. The motor sprocket 64 is mechanically coupled to the drive nut and sprocket assembly 54 by a chain 66 (see FIG. 7). The drive nut and sprocket assembly 54 includes circumferentially-spaced teeth 54*b* that engage the chain 66 (see FIGS. 7 and 21).

Activation of the motor 56 drives the chain 66 which, in turn, causes the drive nut and sprocket assembly 54 to rotate around the drive screw 52. The drive nut and sprocket assembly 54 is threadably coupled to the drive screw 52, and the drive screw 52 is fixed in relation to the deck frame 22, as noted above. Moreover, the drive nut and sprocket assembly 54 is trapped between the rear panel 46*c* of the bracket member 46, and a block member 68 fixedly coupled to the bottom member 45 (see FIG. 6). The drive screw 52 extends through the bock member 68. Preferably, bronze bearings (not shown) or other suitable friction-reducing means are positioned between the drive nut and sprocket assembly 54 and the block member 68, and between the rear panel 46*c* and the drive nut and sprocket assembly 54.

The preceding arrangement causes the drive nut and sprocket assembly 54 to exert a linear force on the drive screw 52 when the drive nut and sprocket assembly 54 is rotated in relation to the drive screw 52. The linear force is reacted by the deck frame 22 (which is secured to the floorboard 40) by way of the first sleeve 58 and the cotter pin 59. (The linear force may also be reacted by the deck frame 22 by way of the second sleeve 62 and the pin 63, depending the direction of rotation of the drive screw 52).

The drive nut and sprocket assembly 54, the bracket member 46, and the various components mounted on the bracket member 46 thus translate linearly, in the forward or rearward directions (depending on the direction of rotation of the drive nut and sprocket assembly 54), in response to rotation of the drive nut and sprocket assembly 54. (Movement of the bracket member 46 in relation to the deck frame 22 is facilitated by the wheels 50, which rotate and travel within the first and second rails 30, 32.)

The platform 20, as discussed above, is mounted on the trolley system 24. The platform 20 thus translates between its upper, extended position and its upper, retracted position in response to rotation of the drive nut and sprocket assembly 54.

It should be noted that the drive nut and sprocket assembly 54 can be driven by gears, a timing belt, a V-belt, or other suitable means in lieu of the chain 66.

Mounting the motor 56 in the position depicted in the figures, its is believed, can decrease the overall length ("x" dimension) of the lift and carrier assembly 10 in relation to conventional mounting arrangements, such as mounting the motor 56 on the outward-facing side of the second cross member 36. Reducing the overall length of the lift and carrier assembly 10 can facilitate use of the lift and carrier assembly 10 in smaller transporting vehicles than may otherwise be possible, and can reduce shipping costs.

Moreover, mounting the motor 56 on the movable bracket member 46, it is believed, can help to minimize the overall length, and the overall length of travel, of the wiring (not shown) that provides power to the motor 56.

Rotating the driving nut and sprocket 54, instead of the drive screw 52, is believed to subject the lead screw to predominately tensile, rather than compressive, loading. Hence, distortion and buckling loads on the drive screw 52 can potentially be reduced in relation to an arrangement in which a drive screw is rotated in relation to a stationary drive nut. Moreover, rotating the nut and sprocket 54, instead of the longer drive screw 52, is believed to minimize the potential for injury to the user caused by fingers, jewelry, clothing, etc., becoming entangled in the rotating components of the trolley system 24.

Moreover, the rigidity of above-described mounting arrangement for the trolley system 24 is relatively low. This characteristic is believed to lessen the potential for the moving components of the trolley system 24 to bind which, in turn, can reduce the power requirements of the motor 56.

The platform 20 can be retracted to its upper, retracted position on a manual basis. This feature can be used in situations where the motor 56 is inoperable due to loss of power or other causes.

The platform 20 can be manually retracted by removing the cotter pin 59 from the first sleeve 58. The first end of the drive screw 52 does not extend completely into the first sleeve 58 when the through holes in the drive screw 52 and the first sleeve 58 are aligned, as noted previously. The drive screw 52 can thus be moved manually in the rearward ("−x") direction after the cotter pin 59 has been removed, so as to position the first end of the drive screw 52 fully in the first sleeve 58. This action cause a corresponding movement of the second end of the drive screw 52 in the "−x" direction. The noted movement of the second end of the drive screw 52 causes the second end of the drive screw 52 to disengage from the pin 63 of the second sleeve 62, as shown in FIG. 12B. The disengagement of the drive screw 52 from the pin 63 facilitates rotation of the drive screw 52 in relation to the first and second sleeves 58, 62, and in relation to the nut and sprocket assembly 54.

Applying force (manually or otherwise) to the platform 20 (or other movable component of the lift and carrier assembly 10) in the rearward direction, after the cotter pin 59 has been removed, causes the drive nut and sprocket assembly 54 to exert a linear force against the drive screw 52. The linear force urges the drive screw 52 toward the second cross member 36, which reacts the linear force. The linear force thereafter causes the drive screw 52 to rotate in relation to the drive nut and sprocket assembly 54, thereby allowing the platform 20 and the movable components of the trolley system 24 to retract, i.e., to translate in the rearward direction.

Re-engagement of the pin 63 and the drive screw 52 prevents rotation of the drive screw 52 in relation to the nut and sprocket 54. This feature can prevent the platform 20 from being moved manually in the forward ("+x") direction. In particular, the pin 63 and the drive screw 52 will remain engaged, or if disengaged, will re-engage within one-half turn of the drive screw 52, when the platform 20 is moved in the forward direction with (or without) the cotter pin 59 removed. This feature can prevent the platform 20 from moving in the forward direction in an uncontrolled manner when the cotter pin 59 is removed. The preceding feature can be particularly useful where the user wishes to manually retract the platform 20 while the platform 20 is tilted downward (in the "+x" and "−z" directions), as for example, when the transporting vehicle is parked on a hill. Moreover, the preceding feature can act as a safety feature that protects the user (or other personnel) from uncontrolled (runaway) movement of the platform 20.

The lift and carrier assembly 10 further comprises a lifting arm 74 (see, e.g., FIG. 2). The lifting arm 74 includes a first member 76, and a second member 78. The second member 78 is fixedly coupled the first member 76 so that the first and second members 76, 78 extend in substantially perpendicular directions.

The lift and carrier assembly 10 also includes a platform frame 80 (see FIGS. 3, 5, 8, and 9A-9C). The platform frame 80 comprises a first cross member 82, a second cross member 84, a first arm member 86, and a second arm member 88. The first cross member 82 is fixedly coupled to a first end of each of the first and second arm members 86, 88 (see FIG. 5). The second cross member 84 is fixedly coupled to a second end of each of the first and second arm members 86, 88 (see FIGS. 9A-9C).

The platform 20 is mounted on the platform frame 80. More particularly, the platform 20 is positioned on the first and second arm members 86, 88, between the first and second cross members 82, 84. The platform 20 can be secured to the first and second arm members 86, 88 using fasteners (not shown) or other suitable means.

The first cross member 82 is fixedly coupled to the second member 78 of the lifting arm 74 using brackets 90 or other suitable means (see FIG. 5). The platform frame 80 (and the platform 20) are thus supported, at least in part, by the lifting arm 74. In addition, the first and second arm members 86, 88 rest on the respective first and second wheels 39 of the deck frame 22, and translate along the respective first and second wheels 39 when the platform 20 moves between its extended and retracted positions (see FIG. 3).

Figure 3:
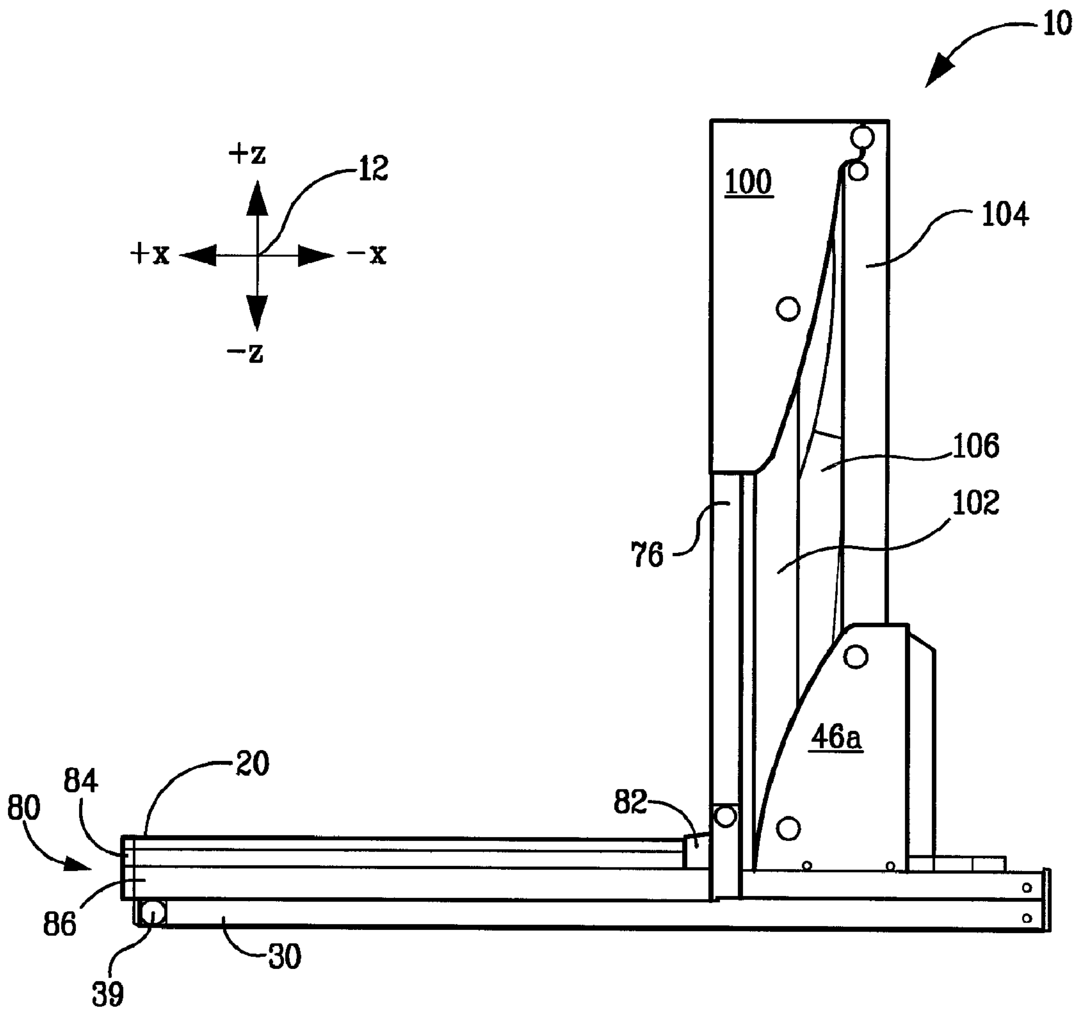
FIG. 3 is a side view of the lift and carrier assembly shown in FIGS. 1 and 2, with the platform in the upper, retracted position.
Figure 6:
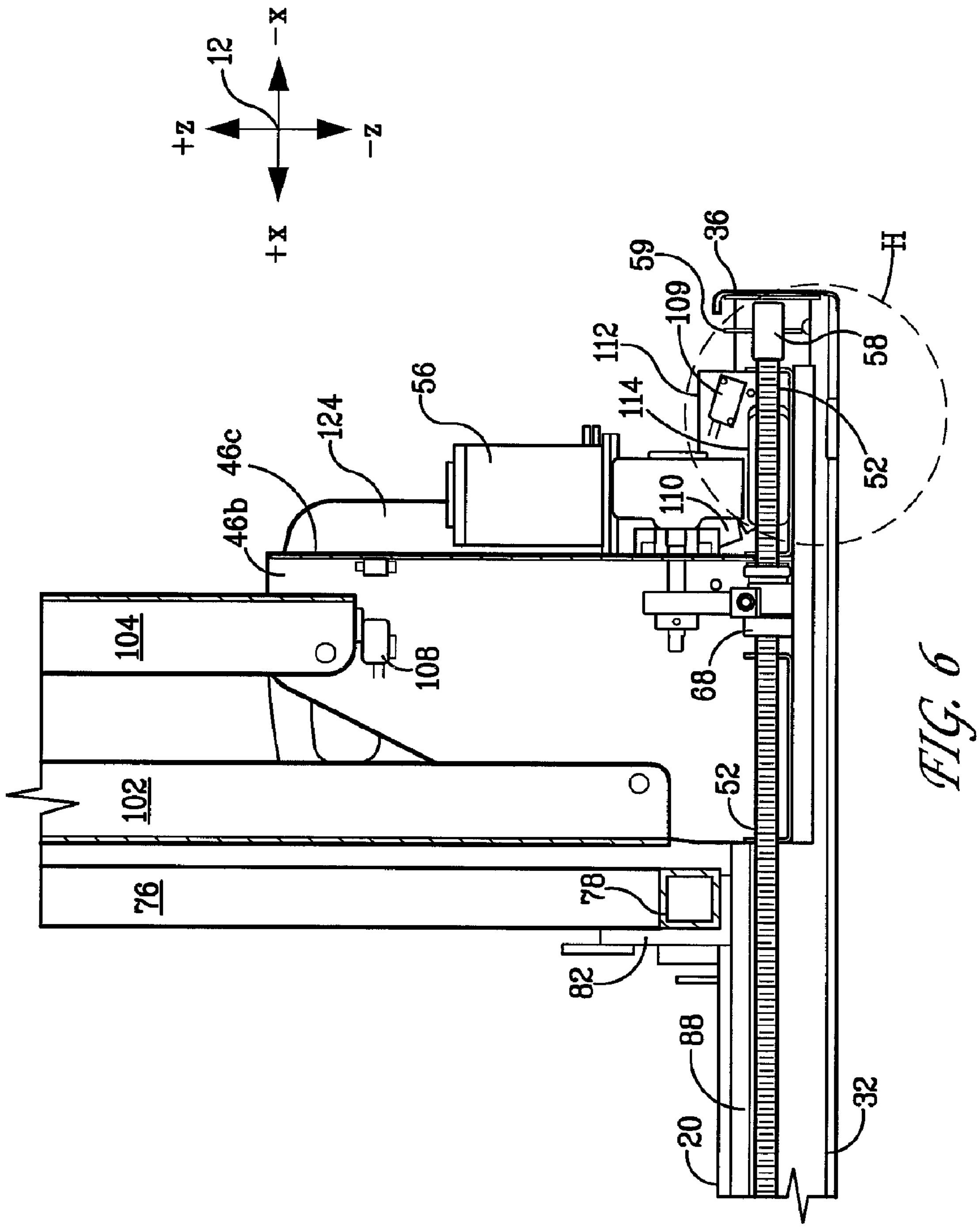
FIG. 6 is a side cross-sectional view of the lift and carrier assembly shown in FIGS. 1-5, taken through the line "B-B" of FIG. 5.

Preferably, the spacing between the first and second arm members 86, 88 of the platform frame 80 is greater than the spacing between the first and second rails 30, 32 of the deck frame 22 (see FIGS. 3, 5, and 6). This feature permits the first and second arm members 86, 88 to be located outward of the first and second rails 30, 32.

Locating the first and second arm members 86, 88 outward (instead of on top) of the first and second rails 30, 32 can help to minimize the overall height of the lift and carrier assembly 10. In particular, the noted arrangement permits at least a portion of the first and second arm members 86, 88 to be lowered to positions below the upper surfaces of the first and second rails 30, 32 (see FIG. 8). The platform 20 can thus be positioned lower in relation to the deck frame 22 (and the floorboard 40) than would otherwise be possible.

The preceding feature, it is believed, can help to minimize the overall height of the lift and carrier assembly 10, and can thus facilitate use of the lift and carrier assembly 10 in space-limited applications where use of a conventional lift and carrier assembly may not be feasible.

Preferably, a first and a second locking pin 96 are fixedly coupled to the second cross member 84 of the platform frame 80 (see FIGS. 9A-12B). The first and second locking pins 96 are preferably mounted on a plate member (not shown) that, in turn, is mounted on an inwardly-facing surface of the second cross member 84. The first and second locking pins 96 project from the plate member in the rearward ("−x") direction.

The first cross member 34 of the deck frame 22 preferably has a first and a second through hole 98 formed therein (see FIGS. 9A, 9B, 11, and 12B). The first and second through holes 98 are substantially aligned with the first and second locking pins 96 so that the first and second locking pins 96 become disposed in the respective first and second through holes 98 as the platform 20 is moved from its upper, extended position to its upper, retracted position (see FIGS. 9A-11).

The first and second through holes 98 are preferably sized so that the respective first and second locking pins 96 fit within the first and second through holes 98 with minimal clearance. This feature, it is believed, helps to restrain the platform 20 from movement in the "y" and "z" directions when the platform 20 is in its upper, retracted position. The preceding feature can thereby alleviate the need for the user to apply auxiliary clamps or straps to hold the platform 20 in position as the lift and carrier assembly 10 (and the power chair 14) are transported in the transporting vehicle.

The arm assembly 26 moves the platform 20 between its upper, extended and lower, extended positions. The arm assembly 26 comprises a bracket member 100, a first arm member 102, a second arm member 104, and an actuator assembly 106 (see FIGS. 1-4 and 15A-18A).

The first member 76 of the lifting arm 74 is fixedly coupled to the bracket member 100 using, for example, fasteners. A first end of the first arm member 102 is pivotally coupled to the bracket member 100, and a second end of the first arm member 102 is pivotally coupled to the bracket member 46 of the trolley system 24. A first end of the second arm member 104 is pivotally coupled to the bracket member 100, and a second end of the second arm member 104 is pivotally coupled to the bracket member 46.

Figure 15A:
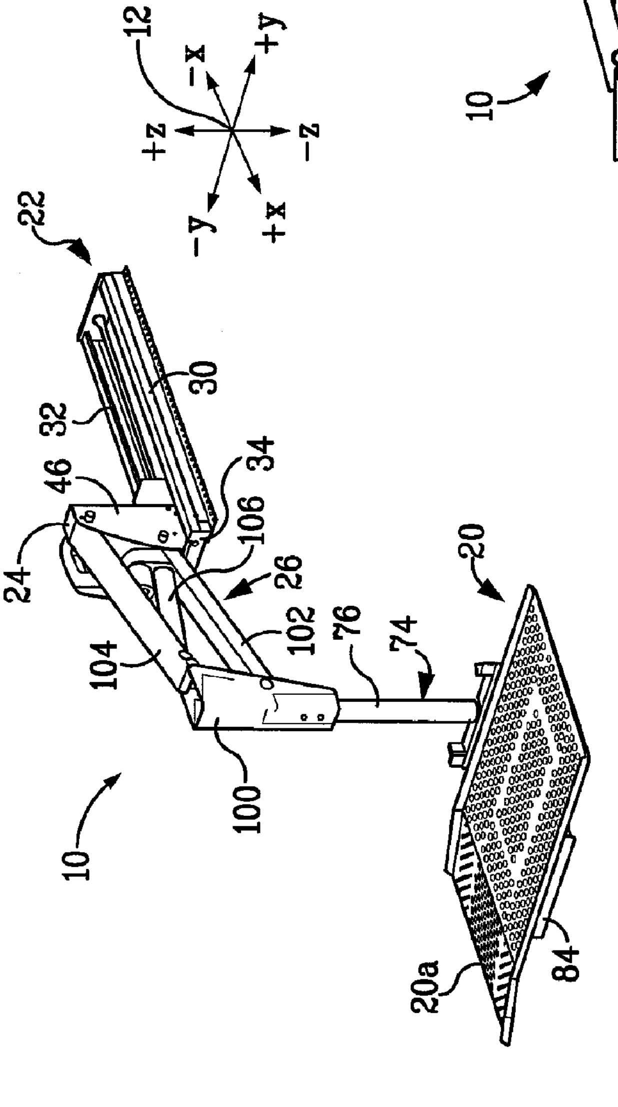
FIG. 15A is a perspective view of the lift and carrier assembly shown in FIGS. 1-14, with the platform of the lift and carrier assembly in a lower extended position.
Figure 15B:
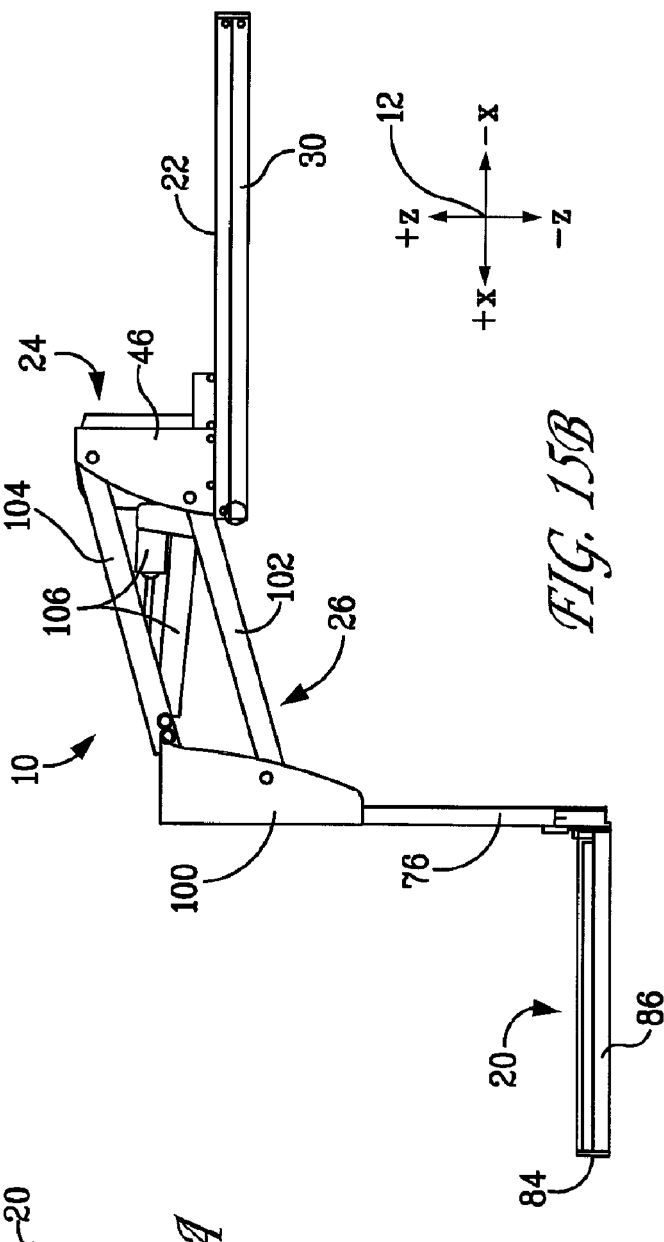
FIG. 15B is a side view of the lift and carrier assembly as shown in FIG. 15A.
Figure 16B:
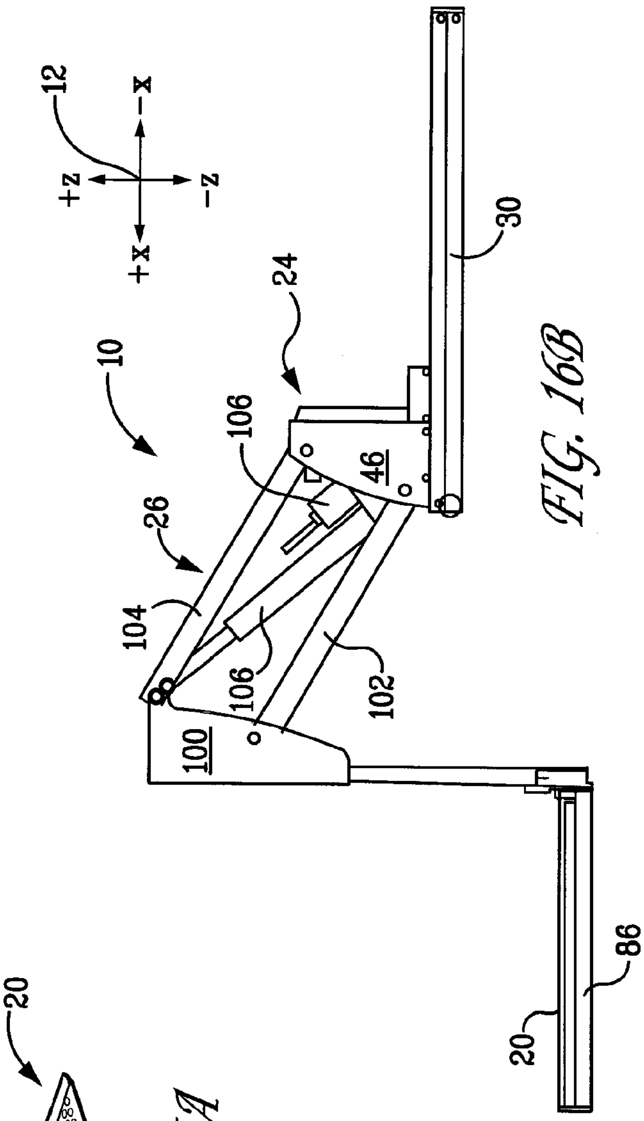
FIG. 16B is a side view of the lift and carrier assembly as shown in FIG. 16A.
Figure 16A:
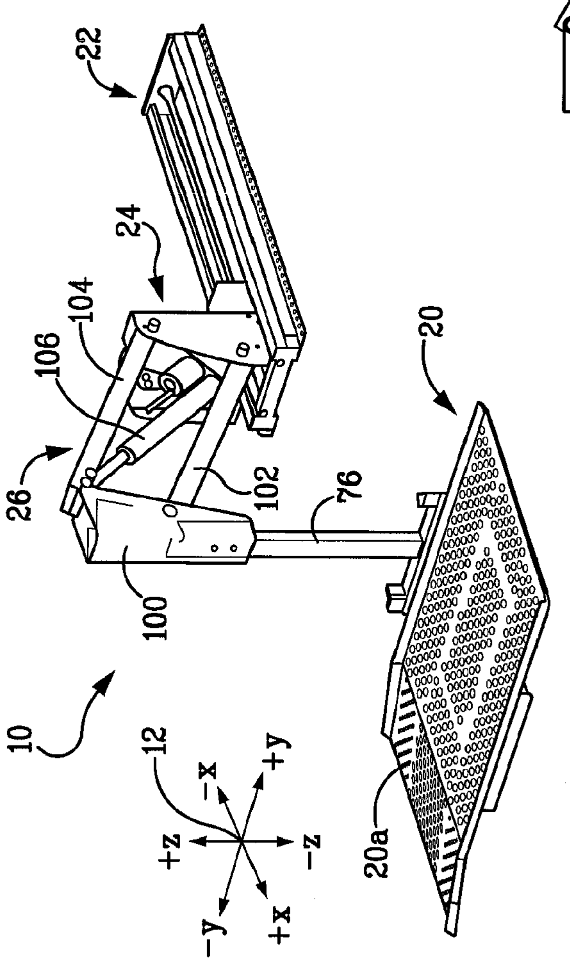
FIG. 16A is a perspective view of the lift and carrier assembly shown in FIGS. 1-15B, with the platform of the lift and carrier assembly translating between a lower, extended position and an upper, extended position.
Figure 17A:
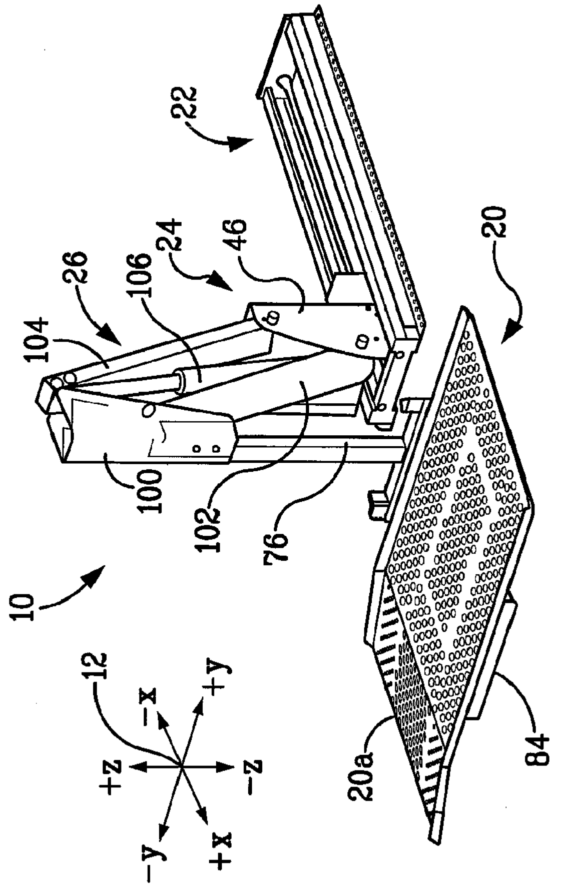
FIG. 17A is a perspective view of the lift and carrier assembly shown in FIGS. 1-16B, with the platform of the lift and carrier assembly translating between a lower, extended position and an upper, extended position.
Figure 17B:
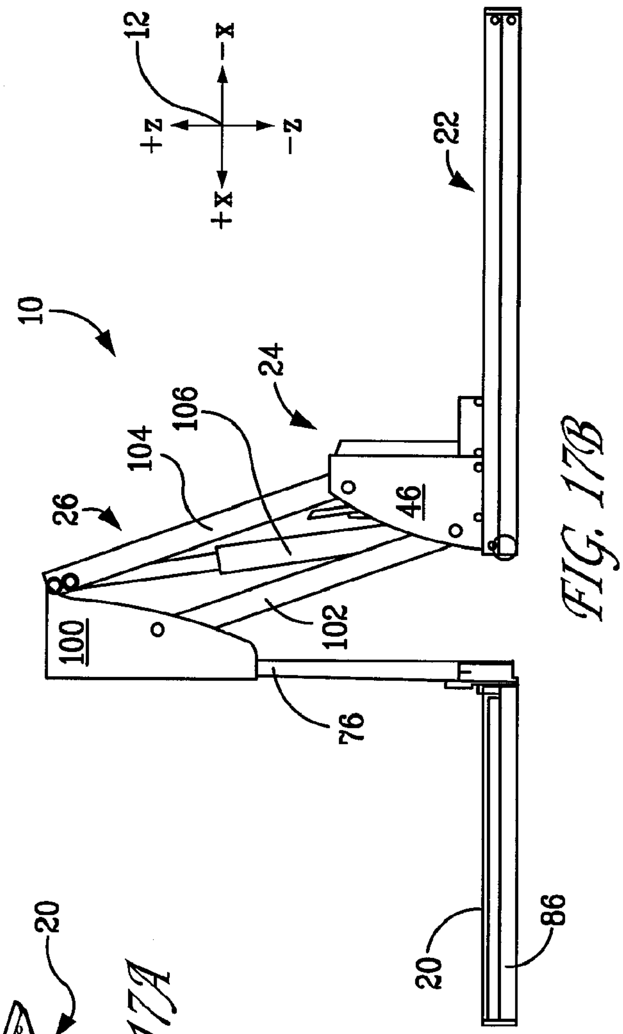
FIG. 17B is a side view of the lift and carrier assembly as shown in FIG. 17A.

A first end of the actuator assembly 106 is pivotally coupled to the bracket member 100, proximate the pivot point between bracket member 100 and the second arm member 104 (see, e.g., FIGS. 1 and 15B). A second end of the actuator assembly 106 is pivotally coupled to the bracket member 46, proximate the pivot point between the bracket member 46 and the first arm member 102.

The actuator assembly 106 is movable between an extended position and a retracted position. Movement of the actuator assembly 106 between its extended position and its retracted position, in conjunction with the above-noted relationships between the bracket members 46, 100, the first and second arms 102, 104, and the actuator assembly 106, causes the platform 20 to move between its upper, extended position and its lower, extended position (see FIGS. 15A-18A).

The lift and carrier assembly 10 preferably comprises a first, a second, and a third limit switch 108, 109, 110. The first limit switch 108 is mounted on an inside surface of the second side panel 46*b* of the bracket member 46, proximate the second end of the second arm member 104 (see FIGS. 6 and 7). The second and third limit switches 109, 110 are mounted on a bracket 112. The bracket 112 is mounted on the bottom member 45 of the trolley system 24.

The first, second, and third limit switches 108, 109, 110 are used to sequence the extension and retraction, and the lowering and raising of the platform 20, as follows.

The first limit switch 108 is activated when the platform 20 is raised from its lower, extended position to its upper, extended position. In particular, the second arm member 104 reaches a vertical position (as depicted in FIG. 6) when the platform 20 is raised to its upper, extended position. The first limit switch 108 is positioned so that the second end of the second arm member 104 contacts the first limit switch 108 when the second arm member 104 reaches its vertical position (see FIG. 6).

Figure 21:
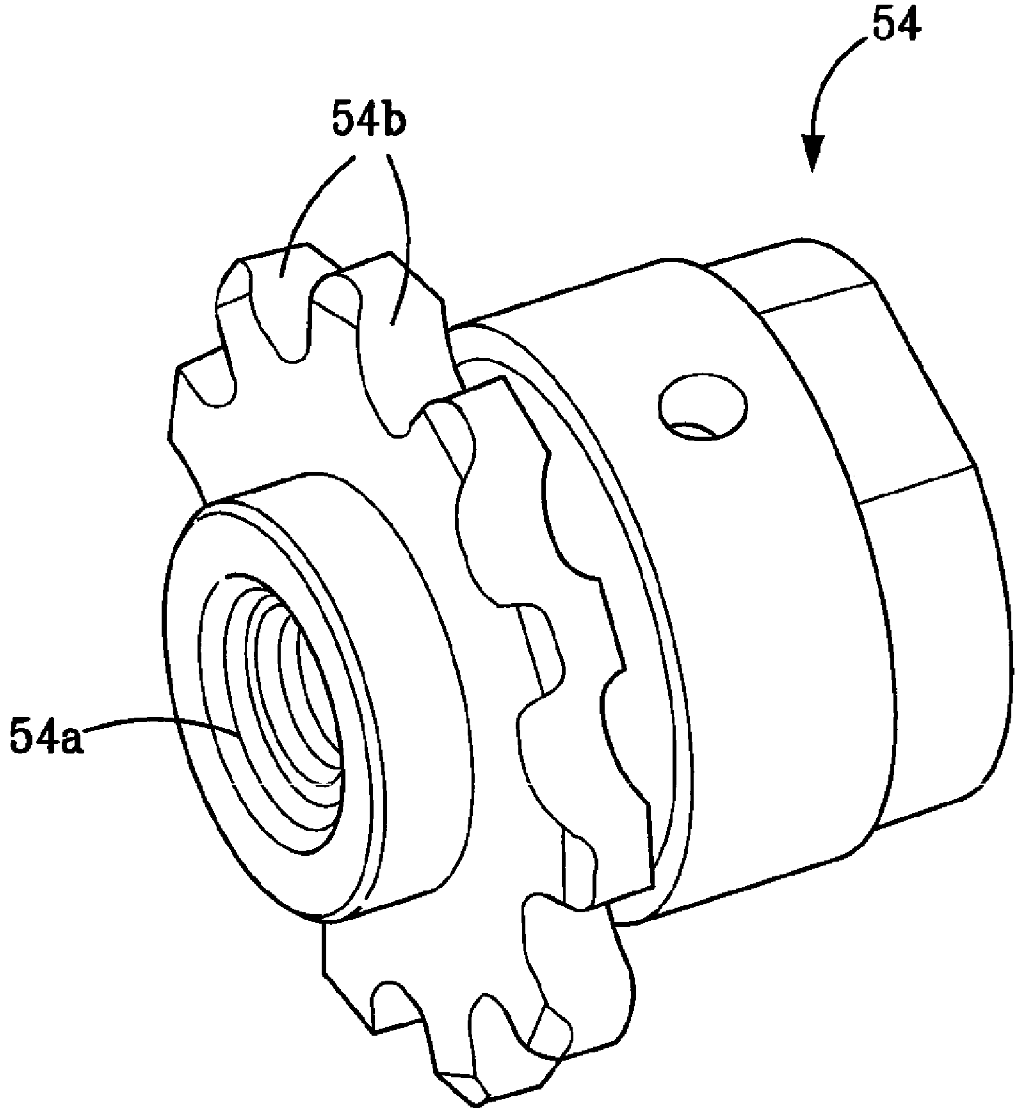
FIG. 21 is a perspective view of a drive nut and socket assembly of the lift and carrier assembly shown in FIGS. 1-19.
Figure 22:
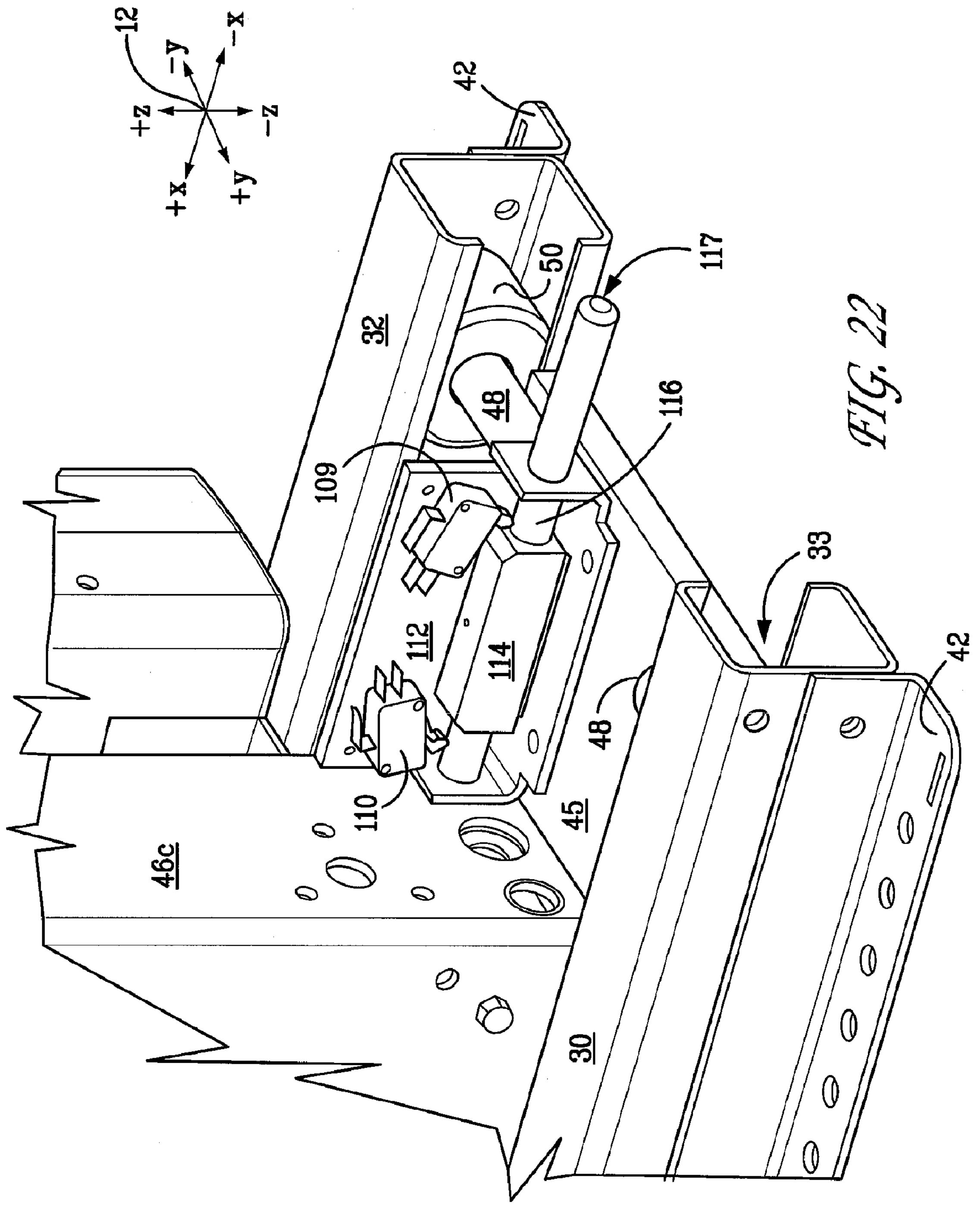
FIG. 22 is a magnified perspective view of the area designated "H" in FIG. 6.

The second and third limit switches 109, 110 are activated by a ramp member 114 (see FIGS. 6 and 22). The ramp member 114 is mounted on a rod member 116 as shown in FIG. 22. The rod member 116 extends through, and is supported by the bracket 112. The rod member 116 and the ramp member 114 can translate in the "x" direction in relation to the bracket 112. The ramp member 114 is centered between the second and third limit switches 109, 110 (as depicted in FIGS. 6 and 21) by springs (not shown).

A first plunger (not shown) mounted on a first end of the rod member 116 contacts the first cross member 34 of the deck frame 22 as the platform 20 approaches its upper, extended position. The first plunger, upon contacting the first cross member 34, exerts a reactive force on the rod member 116 that drives the rod member 116 and the ramp member 114 rearward (in the "−x" direction). The rearward movement of the ramp member 114 causes the ramp member 114 to contact, and thereby activate, the second limit switch 109.

A second plunger 117 (see FIG. 22) mounted on a second end of the rod member 116 contacts the second cross member 36 of the deck frame 22 as the platform 20 approaches its upper, retracted position. The second plunger, upon contacting the second cross member 36, exerts a reactive force on the rod member 116 that drives the rod member 116 and the ramp member 114 forward (in the "+x" direction). The forward movement of the ramp member 114 causes the ramp member 114 to contact, and thereby activate, the third limit switch 110.

Figure 19:
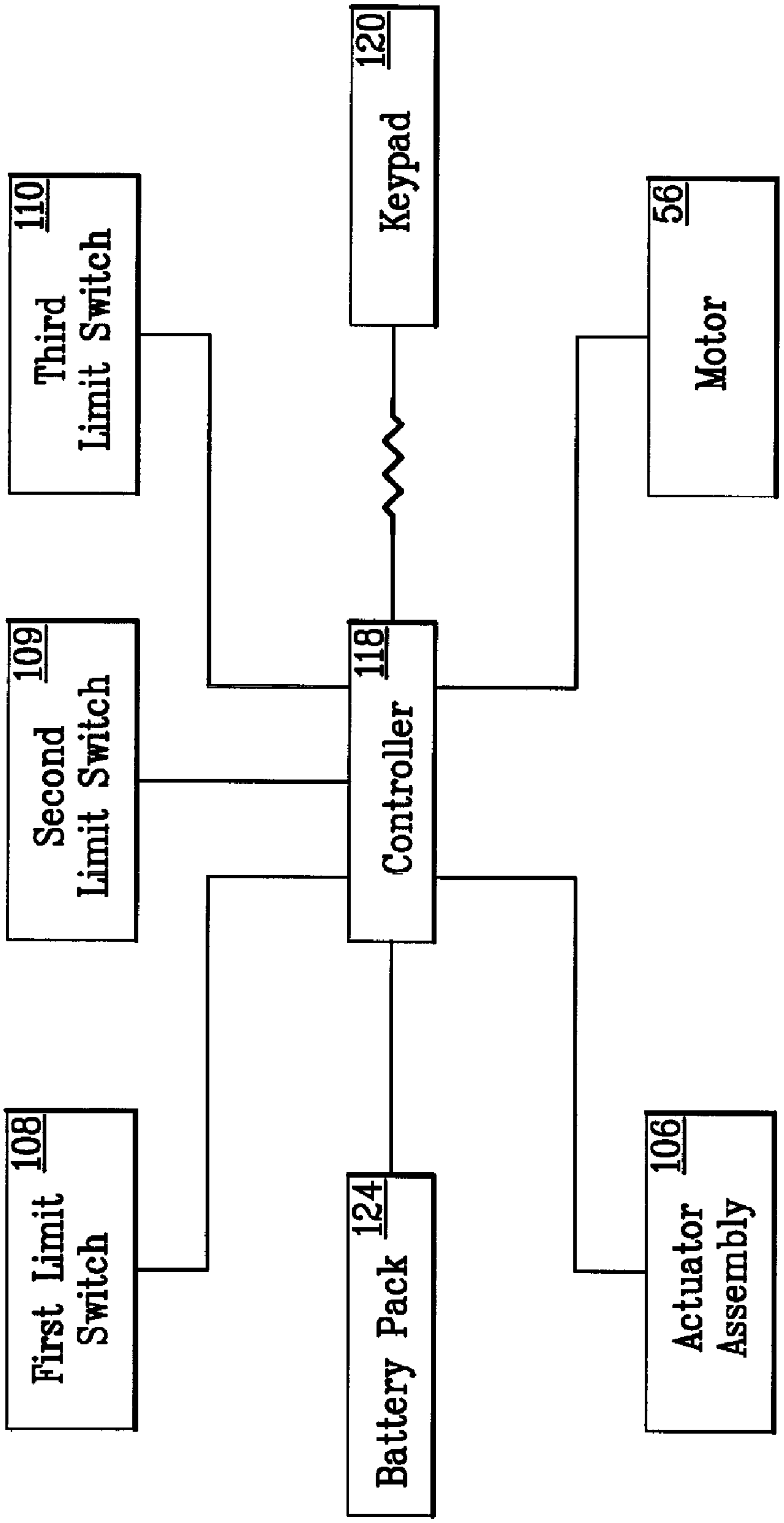
FIG. 19 is a block diagram of various electrical components of the lift and carrier assembly shown in FIGS. 1-18B.
Figure 20:
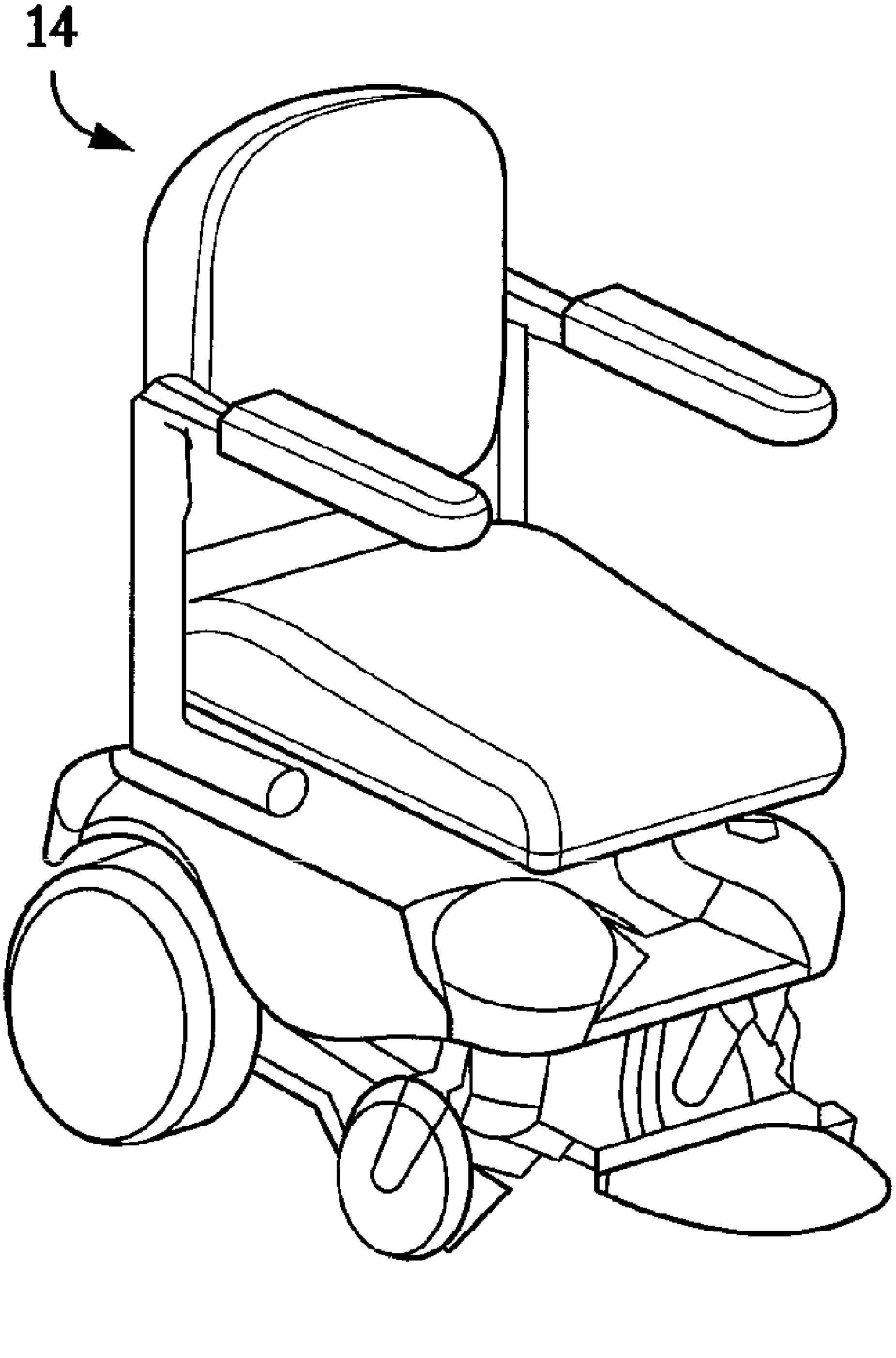
FIG. 20 is a perspective view of a power chair for use with the lift and carrier assembly shown in FIGS. 1-19.

The lift and carrier assembly 10 includes a controller 118 electrically coupled to the motor 56 of the trolley system 24, the actuator assembly 106, and the first, second, and third limit switches 108, 109, 110 (see FIG. 19). The controller 118 can be, for example, a microprocessor-based controller.

The controller 118 is preferably mounted on the bracket member 46 of the trolley system 26. Preferably, user inputs are provided to the controller 118 via a remotely-located control device such as a key pad 120. The key pad 120 can be communicatively coupled to the electric motor by way of electrical wire, or by wireless means such as infrared or radio-frequency communications.

The controller 118, upon receiving a “raise” command from the keypad 120 when the platform 20 in its lower, extended position, activates the actuator assembly 106. The actuator assembly 106 raises the platform 120 from its lower, extended position to its upper, extended position, as shown sequentially in FIGS. 15A-18B. The first limit switch 108 is activated when the platform 20 reaches its upper, extended position, as described above. The controller 118, upon receiving an activation signal from the first limit switch 108, deactivates the actuator assembly 106. The controller 118 simultaneously activates the motor 56 so that the motor 56 drives the platform 20 toward its upper, retracted position.

The third limit switch 110 is activated when the platform 20 reaches its upper, retracted position, as discussed above (see FIGS. 1 and 3). The controller 118, upon receiving an activation signal from the third limit switch 110, deactivates the motor 56.

The controller 118, upon receiving a “lower” command from the keypad 120 when the platform 20 in its upper, retracted position, activates the motor 56 so that the motor 56 drives the platform 20 toward its upper, extended position. The second limit switch 109 is activated when the platform 20 reaches its upper, extended position, as discussed above. The controller 118, upon receiving an activation signal from the second limit switch 109, deactivates the motor 56. The controller 106 simultaneously activates the actuator assembly 106 so that at the actuator assembly 106 begins to lower the platform 20 toward its lower, extended position. The user can deactivate the actuator assembly 106 when the platform 20 reaches is lower, extended position at or near ground level.

Activating the motor 56 and the actuator assembly 106 in the above noted manner is believed to facilitate a smooth and reliable transition between the lifting/lowering action and the extending/retracting action of the lift and carrier assembly 10.

The lift and carrier assembly 10 preferably comprises a battery pack 124 (see, e.g., FIGS. 1, 5, 7, and 8). The battery pack 124 can be a 12 VDC battery pack, or another type of battery pack suitable for use with the motor 56 and the actuator assembly 106. The battery pack 124 is electrically coupled to the motor 56 and the actuator assembly 106, and provides the power required to activate the motor 56 and the actuator assembly 106.

The battery pack 124 is preferably mounted on a bracket 126 so that the battery pack 124 can be removed for recharging or replacement. The bracket 126 is fixedly coupled to the second side panel 46*b* of the bracket member 46. Hence, the battery 108 translates with the motor 56 and the actuator assembly 106. This feature, it is believed, can help to minimize the length of the wiring (not shown) that provides power to the motor 56, the actuator assembly 106, and the controller 118 from the battery pack 124. The use of the battery pack 124 can obviate a need to electrically connect the lift and carrier assembly 10 to the electrical system of the transporting vehicle.

PARTS LIST

Lift and carrier assembly 10
Power chair 14
Latching device 16
Platform 20
Ramp portion 20*a* (of platform 20)
Deck frame 22
Trolley system 24
Arm assembly 26
First rail 30 (of deck frame 22)
Second rail 32
Slots 33 (in first and second rails 30, 32)
First cross member 34
Second cross member 36
Base member 38
Wheels 39
Floorboard 40
Hooks 41
Brackets 42
Tube members 43, 44
Bottom member 45 (of trolley system 24)
Bracket member 46
First side panel 46*a* (of bracket member 46)
Second side panel 46*b*
Rear panel 46*c*
Axles 48
Wheels 50
Drive screw 52
Drive nut and sprocket assembly 54
Teeth 54*b* (on drive nut and sprocket assembly 54)
Motor 56
First sleeve 58
Cotter pin 59
Notch 60 (in drive screw 52)
Second sleeve 62
Pin 63
Motor sprocket 64
Chain 66
Cover 67 (for motor 56)
Block member 68
Lifting arm 74 (of platform assembly 18)
First member 76 (of lifting arm 76)
Second member 78
Platform frame 80
First cross member 82 (of platform frame 80)
Second cross member 84
First arm member 86
Second arm member 88
Brackets 90
Locking pins 96
Through holes 98 (in first cross member 34 of deck frame 22)
Bracket member 100 (of arm assembly 26)
First arm member 102
Second arm member 104
Actuator assembly 106
First limit switch 108
Second limit switch 109
Third limit switch 110
Bracket 112
Ramp member 114
Rod member 116
Plunger 117
Controller 118
Keypad 120
Battery pack 124
Bracket 126

What is claimed is:

1. A lift and carrier assembly for a personal-transportation vehicle, comprising:

a deck frame for mounting on a surface, the deck frame comprising: a first and a second rail; a first cross member fixedly coupled to respective first ends of the first and second rails; a second cross member fixedly coupled to respective second ends of the first and second rails; a first sleeve fixedly coupled to the second cross member of the deck frame; and a second sleeve fixedly coupled to the first cross member of the deck frame;

a trolley assembly mounted on the deck frame and comprising a bottom member, a block member mounted on the bottom member, a bracket member mounted on the bottom member, a drive nut trapped between the bracket member and the block member, a motor mounted on the bracket member for rotating the drive nut, and a drive screw selectively coupled to the first and second sleeves and threadably coupled to the drive nut so that: (i) rotation of the drive nut causes at least a portion of the trolley assembly to translate linearly and in a substantially horizontal direction in relation to the deck frame when the drive screw is held immobile and coupled to the first and second sleeves, and (ii) the drive screw can rotate in relation to the first and second sleeves and the drive nut when the drive screw is decoupled from the first and second sleeves thereby permitting the at least a portion of the trolley assembly to translate linearly and in the substantially horizontal direction in relation to the deck frame when the motor is deactivated;

a platform for supporting the personal-transportation vehicle, the platform being coupled to the trolley assembly so that the platform translates linearly in relation to the deck frame in response to the linear translation of the at least a portion of the trolley assembly; and an arm assembly comprising a first and a second arm member each mechanically coupled to the platform and the trolley assembly, and an actuator pivotally coupled to the first and second arm members for moving the first and second arm members so that first and second arm members lift and lower the platform in relation to the deck frame.

2. The lift and carrier assembly of claim 1, wherein:

the first sleeve receives a first end of the drive screw; and the second sleeve receives a second end of the drive screw.

3. The lift and carrier assembly of claim 2, wherein the second sleeve includes a pin, the second end of the drive screw has a notch formed therein, the second end of the drive screw engages the pin by way of the notch, and engagement of the second end of the drive screw and the pin inhibits the second end of the drive screw from rotating in relation to the second sleeve.

4. The lift and carrier assembly of claim 3, wherein the first end of the drive screw extends only partially into the first sleeve when the first end of the drive screw is held immobile and coupled to the first sleeve and the drive screw engages the pin, and movement of the first end of the drive screw fully into the first sleeve causes the second end of the drive screw to disengage from the pin so that the drive screw can rotate in relation to the first and second sleeves in response to the linear translation of the at least a portion of the trolley assembly in a first direction whereby the platform can translate in the first direction when the motor is deactivated.

5. The lift and carrier assembly of claim 3, wherein movement of the platform in a second direction substantially opposite the first direction when the motor is deactivated causes the drive screw to rotate toward and engage the pin.

6. The lift and carrier assembly of claim 1, wherein the bottom member has the bracket member mounted thereon, a plurality of axles fixedly coupled to the bracket member, and a plurality of wheels rotatably coupled to the plurality of axles, the plurality of wheels being positioned within the first and second rails of the deck frame.

7. The lift and carrier assembly of claim 6, wherein a first of the wheels is rotatably coupled to a first of the axles and is positioned within the first rail of the deck frame so that the first of the wheels can translate linearly within the first rail, and a second of the wheels is rotatably coupled to a second of the axles and is positioned within the second rail of the deck frame so that the second of the wheels can translate linearly within the second rail.

8. The lift and carrier assembly of claim 7, wherein each of the first and second rails of the deck frame have a slot formed therein, and the first and second of the axles extend through the respective first and second slots.

9. The lift and carrier assembly of claim 1, further comprising a platform frame comprising a first and a second arm member, a first cross member fixedly coupled to respective first ends of the first and a second arm members; and a second cross member fixedly coupled to respective second ends of the first and a second arm members, wherein the platform is mounted on the first and second arm members of the platform frame and the first cross member of the platform frame is fixedly coupled to the arm assembly.

10. The lift and carrier assembly of claim 9, wherein the first and second rails of the deck frame are spaced apart by a first distance, and the first and second arm members of the platform frame are spaced apart by a second distance greater than the first distance.

11. The lift and carrier assembly of claim 9, further comprising a pin fixedly coupled to the second cross member of the platform frame, wherein the first cross member of the deck frame has a hole formed therein for receiving the pin when the platform is in a first position in relation to the deck frame so that interference between the pin and the first cross member of the platform frame inhibits movement of the platform in relation to the deck frame when the platform is in the first position.

12. The lift and carrier assembly of claim 11, further comprising two of the pins, wherein the deck frame has two of the holes formed therein for receiving respective ones of the pins.

13. The lift and carrier assembly of claim 11, wherein interference between the pin and the first cross member of the deck frame inhibits movement of the platform in a vertical direction and a lateral direction in relation to the deck frame when the platform is in the first position.

14. The lift and carrier assembly of claim 1, wherein the drive screw is a multi-start screw.

15. The lift and carrier assembly of claim 1, further comprising a battery electrically coupled to the motor and the actuator for powering the motor and the actuator.

16. The lift and carrier assembly of claim 15, wherein the battery is mounted on the bracket member.

17. The lift and carrier assembly of claim 1, wherein:

the arm assembly further comprises a bracket member;

a first end of the first arm member of the arm assembly is pivotally coupled to the bracket member of the arm assembly;

a second end of the first arm member of the arm assembly is pivotally coupled to the bracket member of the trolley assembly;

a first end of the second arm member of the arm assembly is pivotally coupled to the bracket member of the arm assembly; and a second end of the second arm member of the arm assembly is pivotally coupled to the bracket member of the trolley assembly.

18. The lift and carrier assembly of claim 1, wherein the platform translates linearly in relation to the deck frame between an extended position and a retracted position, and the first and second arm members of the arm assembly lift and lower the platform in relation to the deck frame between an upper position and a lower position.

19. The lift and carrier assembly of claim 18, further comprising a first, a second, and a third limit switch mounted on the trolley system so that the first limit switch generates an output in response to movement of the platform to the upper position as the platform is in the extended position, the second limit generates an output in response to movement of the platform to the extended position as the platform is in the upper position, and the third limit switch generates an output in response to movement of the platform to the retracted position as the platform is in the upper position.

20. The lift and carrier assembly of claim 19, wherein the first limit switch is mounted on the bracket member, and the second and third limit switches are mounted on the bottom member.

21. The lift and carrier assembly of claim 19, further comprising a controller electrically coupled to the motor, the actuator assembly, and the first, second, and third limit switches, wherein the controller:

activates the actuator assembly in response to a first input to the controller so that the platform moves from the lower position to the upper position as the platform is in the extended position;

deactivates the actuator assembly and activates the motor in response to the output of the first limit switch so that the platform moves from the extended position to the retracted position as the platform is in the upper position; and deactivates the motor in response to the output of the third limit switch.

22. The lift and carrier assembly of claim 21, wherein the controller:

activates the motor in response to a second input to the controller so that the platform moves from the retracted position to the extended position as the platform is in the upper position;

deactivates the motor in response to the output of the second limit switch; and activates the actuator in response to the output of the second limit switch so that the platform moves from the upper position to the lower position as the platform is in the extended position.

23. The lift and carrier assembly of claim 1, further comprising a drive nut and sprocket assembly, the drive nut and sprocket assembly comprising the drive nut and a first sprocket coupled to the drive nut so that rotation of the first sprocket in relation to the drive screw causes the drive nut to rotate in relation to the drive screw.

24. The lift and carrier assembly of claim 23, further comprising a second sprocket mounted on the motor, and a chain for transmitting torque between the first and second sprockets.

25. The lift and carrier assembly of claim 1, further comprising a tube member for mounting between the deck frame and the surface.

26. The lift and carrier assembly of claim 1, wherein the arm assembly further comprises a bracket member having the first and second arm members pivotally coupled thereto.

* * * * *